United States Patent
Räsänen et al.

(10) Patent No.: US 9,955,292 B2
(45) Date of Patent: Apr. 24, 2018

(54) LOCATION-BASED NOVELTY INDEX VALUE AND RECOMMENDATION SYSTEM AND METHOD

(75) Inventors: Eero Räsänen, Tampere (FI); Roman Kikta, Dallas, TX (US); Antti Sorvari, Itäsalmi (FI); Jukka-Pekka Salmenkaita, Helsinki (FI); Ykä Huhtala, Helsinki (FI); Heikki Mannila, Espoo (FI); Hannu T. Toivonen, Helsinki (FI); Kari Oinonen, Lempäälä (FI); Juhani Murto, Helsinki (FI)

(73) Assignee: Nokia Corporation, Espoo (FI)

(*) Notice: Subject to any disclaimer, the term of this patent is extended or adjusted under 35 U.S.C. 154(b) by 2025 days.

(21) Appl. No.: 13/205,347

(22) Filed: Aug. 8, 2011

(65) Prior Publication Data

US 2011/0295551 A1    Dec. 1, 2011

Related U.S. Application Data

(60) Division of application No. 12/413,210, filed on Mar. 27, 2009, now abandoned, which is a continuation of application No. 12/041,971, filed on Mar. 4, 2008, now Pat. No. 7,529,639, which is a division of application No. 10/024,282, filed on Dec. 21, 2001.

(51) Int. Cl.
*G06Q 30/00* (2012.01)
*H04W 4/02* (2018.01)

(52) U.S. Cl.
CPC .................... *H04W 4/02* (2013.01)

(58) Field of Classification Search
CPC .......... G01S 1/68; G01S 5/02; G06F 17/30241
See application file for complete search history.

(56) References Cited

U.S. PATENT DOCUMENTS

| 5,155,689 A | 10/1992 | Wortham |
| 5,555,446 A | 9/1996 | Jasinski |
| (Continued) | | |

FOREIGN PATENT DOCUMENTS

| EP | 0 865 188 A2 | 9/1998 |
| GB | 2 349 551 A | 11/2000 |

OTHER PUBLICATIONS

"Nokia WAP Client Version 2.0, Product Overview," Nokia Internet Communications, 2000, www.nokia.com/corporate/wap.

(Continued)

*Primary Examiner* — Elias Desta
(74) *Attorney, Agent, or Firm* — Ditthavong & Steiner, P.C.

(57) ABSTRACT

The invention is a system and method for computing a result for a location, wherein the result indicates how novel it is for a wireless device to occupy a specific location. After determining the location of a wireless device through various means, a Novelty Index Value (NIV) is calculated for the location, and the NIV is then stored into a database. The NIV may then be subsequently used by application programs to compute a desired result from the NIV. Multiple users may utilize and/or share the same NIV values. The NIV may also be used to alter the configuration of a wireless device as well. A recommendation system is also disclosed, wherein user context is utilized along with NIV values to compute particular results for a user.

20 Claims, 22 Drawing Sheets

(56) References Cited

U.S. PATENT DOCUMENTS

| | | |
|---|---|---|
| 5,559,312 A | 9/1996 | Lucero |
| 5,696,906 A | 12/1997 | Peters et al. |
| 5,758,332 A | 5/1998 | Hirotani |
| 5,790,974 A | 8/1998 | Tognazzini |
| 5,875,400 A | 2/1999 | Madhavapeddy et al. |
| 5,933,100 A | 8/1999 | Golding |
| 5,983,109 A | 11/1999 | Montoya |
| 6,061,570 A | 5/2000 | Janow |
| 6,073,075 A | 6/2000 | Kondou et al. |
| 6,088,730 A | 7/2000 | Kato et al. |
| 6,115,611 A | 9/2000 | Kimoto et al. |
| 6,133,853 A | 10/2000 | Obradovich et al. |
| 6,167,441 A | 12/2000 | Himmel |
| 6,173,316 B1 | 1/2001 | De Boor et al. |
| 6,181,935 B1 | 1/2001 | Gossman et al. |
| 6,195,692 B1 | 2/2001 | Hsu |
| 6,263,208 B1 | 7/2001 | Chang et al. |
| 6,327,535 B1 | 12/2001 | Evans et al. |
| 6,414,955 B1 | 7/2002 | Clare et al. |
| 6,418,330 B1 | 7/2002 | Lee |
| 6,421,707 B1 | 7/2002 | Miller et al. |
| 6,430,276 B1 | 8/2002 | Bouvier et al. |
| 6,507,569 B1 | 1/2003 | Crichton |
| 6,732,080 B1 | 5/2004 | Blants |
| 6,736,727 B1 | 5/2004 | Doi et al. |
| 6,748,195 B1 * | 6/2004 | Phillips ............. H04M 1/72569 370/338 |
| 8,566,884 B2 * | 10/2013 | Toebes ................... G06Q 10/00 707/758 |
| 2006/0022048 A1 * | 2/2006 | Johnson ..................... 235/462.1 |
| 2006/0282496 A1 * | 12/2006 | Leiber ................... G06Q 30/02 709/203 |

OTHER PUBLICATIONS

Charniak, "Statistical Language Learning," MIT Press, Cambridge, Massachusetts, 1993.

Fields et al., "Web Developmenet with Java Server Pages," Manning Publications Co., 2000, ISBN-13: 978-1930110120.

Fraser et al., "Forecasting Probability Densities by Using Hidden Markov Models with Mixed States," Time Series Prediction: Forecasting the Future and Understanding the Past, pp. 265-281, Addison-Wesley, 1993.

Jeong et al., "Probabilistic Location Update for Advanced Cellular Mobile Networks," IEEE Communications Letters, vol. 2, No. 1, Jan. 1998, pp. 8-10.

Reynolds, "Beginning E-Commerce with Visual Basic, ASP, SQL Server 7.0 and MTS", Wrox Press Ltd., 2000, ISBN-13: 978-1861003980.

Rabiner et al., "An Introduction to Hidden Markov Models," IEEE ASSP Magazine, Jan. 1986, pp. 4-15.

Rabiner, "A Tutorial on Hidden Markov Models and Selected Applications in Speech Recognition," Proceedings of the IEEE, vol. 77, No. 2, 1989, pp. 257-286.

Roman, "Mastering Enterprise Java Beans and the Java 2 Platform," Enterprise Edition, John Wiley & Sons, Inc., 1999, ISBN-13: 978-0471332299.

* cited by examiner

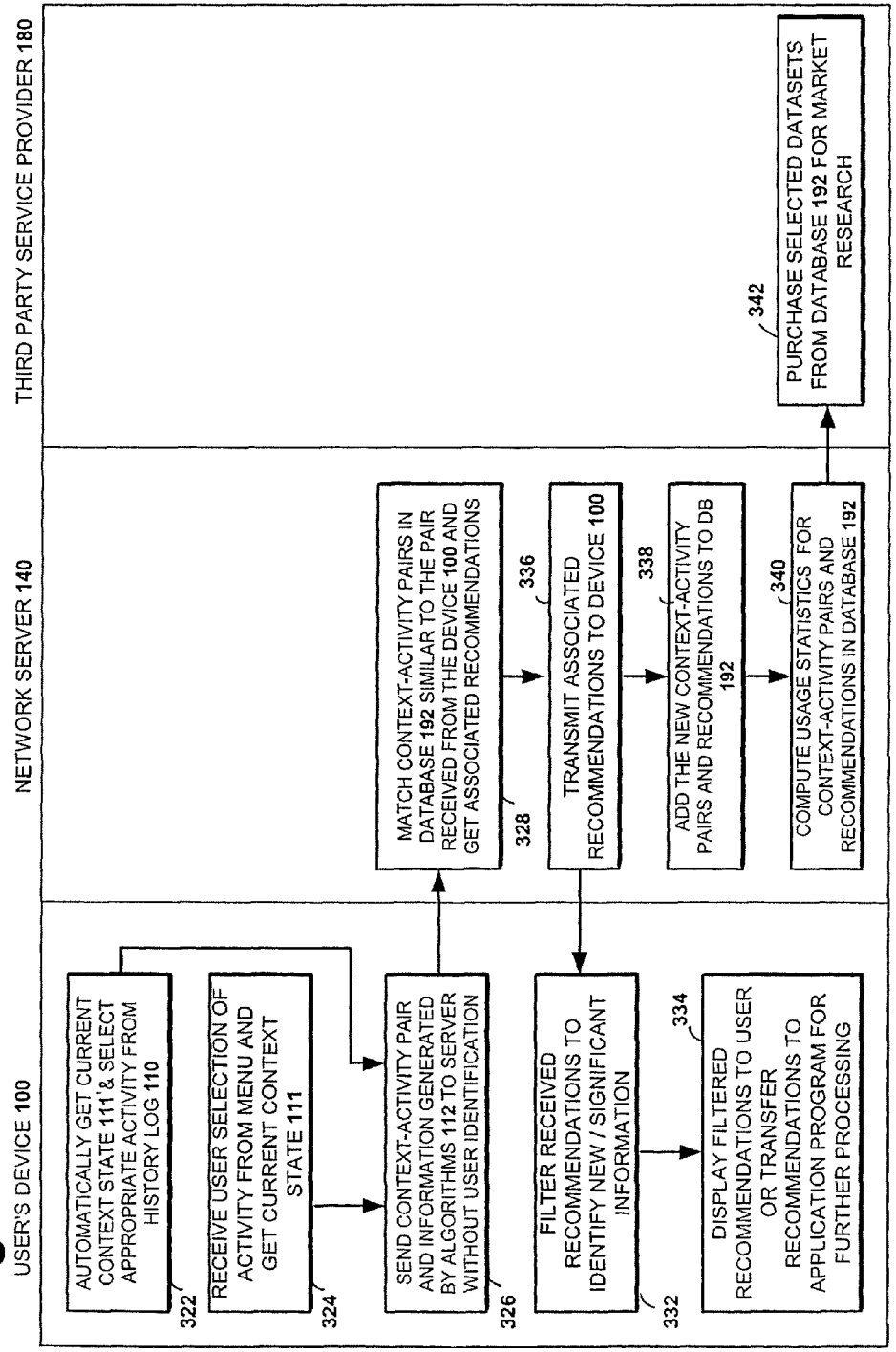

Figure 8B

| CONTEXT-ACTIVITY PAIRS AND SERVICES DATABASE 192 IN SERVER 140 | | |
|---|---|---|
| CONTEXT-ACTIVITY PAIRS | SERVICE RECOMMENDATIONS | NUMBER TIMES RECOMMENDED |
| ACTIVITY:<br>  DINING - restaurant<br>CONTEXT:<br>  LOCAL TIME: 6:00 PM - 11:59 PM<br>  LOCATION: Beale St, Memphis TN<br>  LIGHT LEVEL: Night<br>  AMBIENT TEMPERATURE:<br>    15 C - 25 C<br>  SPEED - ACCELERATION:<br>    0 - 50 kph | Joe's Beef Barbecue Restaurant<br>Elvis' Place<br>The Blues Diner<br>The Gourmet Restaurant<br>Dan's Fast Food Restaurant | R=20<br>R=33<br>R=18<br>R=25<br>R=40 |
| ACTIVITY:<br>  DINING - restaurant<br>CONTEXT:<br>  LOCAL TIME: 5:00 AM - 10:59 AM<br>  LOCATION: Beale St, Memphis TN<br>  LIGHT LEVEL: Daylight<br>  AMBIENT TEMPERATURE:<br>    15 C - 25 C<br>  SPEED - ACCELERATION:<br>    0 - 50 kph | Pancake Restaurant<br>Great Start Diner<br>Betty's Homestyle Breakfast<br>Mike's Quick Breakfasts<br>Dan's Fast Food Restaurant | R=120<br>R=100<br>R=130<br>R=150<br>R=120 |
| | | |

Figure 8C

| CONTEXT-ACTIVITY PAIRS AND SERVICE HISTORY LOG 110 IN DEVICE 100 | | RECEIVE BUFFER IN DEVICE 100 |
|---|---|---|
| CONTEXT-ACTIVITY PAIR HISTORY | HISTORY OF SERVICES USED | RECOMMENDATIONS FROM SERVER |
| ACTIVITY:<br>  DINING - restaurant<br>CONTEXT:<br>  LOCAL TIME: 6:00 PM - 11:59 PM<br>  LOCATION: Beale St, Memphis TN<br>  LIGHT LEVEL: Night<br>  AMBIENT TEMPERATURE: 15 C - 25 C<br>  SPEED - ACCELERATION: 0 - 50 kph | The Gourmet Restaurant [USER'S RATING = 8]<br>Dan's Fast Food Restaurant [USER'S RATING = 6] | Joe's Beef Barbecue Restaurant   R=20<br>Elvis' Place   R=33<br>The Blues Diner   R=18<br>The Gourmet Restaurant   R=25<br>Dan's Fast Food Restaurant   R=40 |
| ACTIVITY:<br>  DINING - restaurant<br>CONTEXT:<br>  LOCAL TIME: 5:00 AM - 10:59 AM<br>  LOCATION: Beale St, Memphis TN<br>  LIGHT LEVEL: Daylight<br>  AMBIENT TEMPERATURE: 15 C - 25 C<br>  SPEED - ACCELERATION: 0 - 50 kph | Mike's Quick Breakfasts [USER'S RATING = 8]<br>Dan's Fast Food Restaurant [USER'S RATING = 5] | Pancake Restaurant   R=120<br>Great Start Diner   R=100<br>Betty's Homestyle Breakfast   R=130<br>Mike's Quick Breakfasts   R=150<br>Dan's Fast Food Restaurant   R=120 |
| | | |

LOCATION-BASED NOVELTY INDEX VALUE AND RECOMMENDATION SYSTEM AND METHOD

RELATED APPLICATIONS

This application is a Divisional of U.S. patent application Ser. No. 12/413,210, filed Mar. 27, 2009, which is a Continuation of U.S. patent application Ser. No. 12/041,971, filed Mar. 4, 2008, which is a Divisional of U.S. patent application Ser. No. 10/024,282, filed Dec. 21, 2001, entitled "Location-Based Novelty Index Value and Recommendation System and Method"; the entireties of which are incorporated herein by reference.

FIELD OF THE INVENTION

The invention disclosed broadly relates to location services for handheld wireless devices and more particularly relates to improvements in the accessing of services based on the location or context of the wireless device, and further provides a system and method for providing recommendations on user location(s) and/or preferences.

BACKGROUND OF THE INVENTION

Mobile phones and wireless personal digital assistants (PDAs) are able to access the Internet using I-Mode protocol, mobile IPv6 protocol or the Wireless Application Protocol (WAP). WAP-enabled wireless devices can now access Internet applications such as headline news, exchange rates, sports results, stock quotes, weather forecasts, multilingual phrase dictionaries, personal online calendars, online travel and banking services, or download distinctive ringing tones. Broadband wireless networks make it possible for WAP-enabled wireless devices to exchange multimedia messages that combine conventional text with much richer content types, such as photographs, images, voice clips, and video clips. WAP-enabled wireless devices can be used to pay bills online using the wireless device as a virtual wallet. WAP-enabled wireless devices can deliver useful and informative advertising and transaction services from online merchants. WAP-enabled wireless devices now also provide entertainment services, such as interactive adventure games, quizzes, and chess tournaments.

People tend to travel over the same paths from day to day. They follow their daily routines by going to work, coming back home, putting children to day-care and getting food from a local shop, etc. Using uncommon routes or travelling to places that are not part of the daily routines can be considered as exceptions. More and more, people are carrying handheld wireless devices as they carry on their daily routines, so as to remain in contact with home, work, and on line services. What is needed is a location service for handheld wireless devices, to enable users to create augmented reality services by setting up virtual environment that uses real-world locations. What is needed is a way for a mobile device/phone user to access the augmented reality services by moving inside the service's "real world" location. Another challenge of augmented reality systems is the placement of the augmented data. When using absolute locations for the augmented data, most users won't find some of the augmented data or may find it too easily because of daily routines.

What the prior art needs is a way to personalize the augmented reality services for each user so that the applications will know how novel each location is for the user by using methods and services described in this invention. By personalizing the augmented reality data for each user, it is possible to create an augmented reality that reaches each user in a manner that is more consistent with the spirit and scope of augmented reality systems and services.

Recommendation systems use information of the activity histories or preferences of numerous users to produce useful recommendations for a single user. Existing recommendation systems use collaborative filtering methods to produce recommendations for an individual user by analyzing the actions and preferences of a group of individuals. As the use of information technology has become widespread in all areas of human life, the concerns of individuals over their privacy have increased. Specifically, most distributed recommendation systems were developed for wireline Internet services, and the privacy concerns will significantly increase as the services are adopted for use by more personal, wireless devices.

What is needed is a distributed recommendation system for handheld wireless devices, to enable users to access recommendation services by moving inside the service's real world location. It would further be useful to enable third parties to access information which is a function of the wireless device's location.

SUMMARY OF THE INVENTION

The invention is a method for computing a result for a location, the result depending on how novel it is for a wireless device to occupy the location. In one embodiment of the invention, the method begins with the step of determining the location of a wireless device. Then, in accordance with the invention, the method computes a novelty index value for the location, characterizing how novel it is for the wireless device to occupy the location, and stores the novelty index value in a database. The method then runs a program to determine a result that depends on the novelty index value. To do this the method accesses the database for information associated with the novelty index value and then computes the result using the information. In a preferred embodiment, the database can be an integral part of the wireless device. In an alternate embodiment, the database can be in a server, remote from the wireless device.

In another embodiment of the invention, a method enables the wireless device to provide recommendations to its user that are appropriate to the device's current environment. The recommendation can be in the form of mobile Internet WML pages of a portal, or other service provider. The method begins by receiving sensor signals characterizing a current environment of the wireless device, processing the sensor signals with a context inference engine, and then outputting a current context result from the processing by the context inference engine. Then, in accordance with the invention, the method computes a novelty index value for the current context result, characterizing how novel it is for the wireless device to occupy the current context and stores the novelty index value in a database. The method then runs a program to determine a result that depends on the novelty index value. To do this the method accesses the database for information associated with the novelty index value and then computes the result using the information.

In still another embodiment of the invention, a method computes a result for a location, the result depending on how novel it is for a wireless device to occupy the location. The method begins by determining the location of a wireless device. Then, in accordance with the invention, the method computes a novelty index value for the location, characterizing how novel it is for the wireless device to occupy the location and stores the novelty index value in a database. The method then runs a program in a second terminal to determine a result that depends on the novelty index value. It does this by accessing with the second terminal the database for information associated with the novelty index value and computing the result using the information.

In yet another embodiment of the invention, a method changes a wireless device configuration for a location, the configuration depending on how novel it is for the wireless device to occupy the location. The method begins by determining the location of a wireless device. Then, in accordance with the invention, the method computes a novelty index value for the location, characterizing how novel it is for the wireless device to occupy the location and stores the novelty index value in a database. The method then runs a program to determine a result that depends on the novelty index value. It does this by accessing the database for information associated with the novelty index value. The method then changes a configuration of the wireless device using the information.

One aspect of the invention is personalizing the augmented reality services for each wireless device user. This enables applications to know how novel is each location traversed by the user. The novelty value of a location traversed by the user is calculated by using the travelling and moving in real world as input. The definition of the location can be defined in various different ways, such as coordinate based (GPS), proximity based (Bluetooth, proximity sensor) or cell based (triangulation methods with mobile networks). The location coordinates are trimmed into coordinate grid that is described for this invention.

Other services can query Novelty Index Value databases (NIV) for detecting the suitable placements for augmented data. An augmented reality application processes the data and can determine which data can be accessed more easily and which data should be hidden or harder to find. This information can be then converted to NIV queries that are sent to the system. The NIV system would then return a set of suitable locations according to the user NIV values.

The accumulation of NIVs during a certain time period or between certain locations is also utilized under an embodiment of the present invention. For instance, when a user is using identical routes while moving, the user does not accumulate NIV values. However, when a user is moving between places by using different routes or paths, and rarely traversing across old routes, a very large NIV value will accumulate for that user.

This information can be used for creating a personalized augmented reality for each user, where uncommon behavioral patterns in travelling from place to place is registered through NIV values. The NIV values can also be used for controlling various features in augmented reality applications. The NIV feature may also be combined, or run independently with a recommendation service to provide users with a variety of browsing or file-accessing options.

The invention applies to many wireless standards. The invention applies, for example, to the IEEE 802.11 Wireless LAN standards, the Japanese 3rd Generation (3G) wireless standard, the various 2G, 2.5G, and 3G cellular telephone system standards, the Infrared Data Association (IrDA) standard, the Digital Enhanced Cordless Telecommunications (DECT) standard, the Shared Wireless Access Protocol (SWAP) standard, the IEEE 802.15 Wireless Personal Area Network (WPAN) standard, the High Performance Radio Local Area Network (HIPERLAN) standards, and the Multimedia Mobile Access Communication (MMAC) Systems standard of the Japanese Association of Radio Industries and Businesses.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4A discloses an embodiment of the invention showing a user screen using an altered NIV device configuration;

FIG. 8A is a network process flow diagram of the interaction of the wireless device and network server when the user's wireless device sends a requested context-activity pair which is sent to the network server and the resultant service recommendations are received back from the server;

FIG. 8B shows the context-pairs and services database in the network server;

FIG. 8C shows the context-pairs and service history log in the device;

DESCRIPTION OF THE PREFERRED EMBODIMENT

In the following description of the various embodiments, reference is made to the accompanying drawings that form a part hereof, and in which is shown, by way of illustration, various embodiments in which the invention may be practiced. It is understood that other embodiments may be utilized, and structural and functional modifications may be made without departing from the spirit and scope of the present invention.

The invention is based on methods for computing results for a location, wherein the results depend on how novel it is for a wireless device to occupy the location. In one embodiment of the invention, the method begins with the step of determining the location of a wireless device. Then, in accordance with the invention, the method computes a novelty index value for the location, characterizing how novel it is for the wireless device to occupy the location, and stores the novelty index value in a database. The method then runs a program to determine a result that depends on the novelty index value. To do this the method accesses the database for information associated with the novelty index value and then computes the result using the information.

One aspect of the invention is personalizing the Novelty Index Value (NIV) services for each wireless device user. This enables applications to know how novel is each location traversed by the user. The novelty value of a location traversed by the user is calculated using real world inputs. The user input or location can be defined in various ways, such as coordinate based (GPS), proximity based (Bluetooth, proximity sensor) or cell based (triangulation methods with mobile networks). The location coordinates are trimmed into various numbers of coordinate grids that are described in greater detail below.

Figure 1:
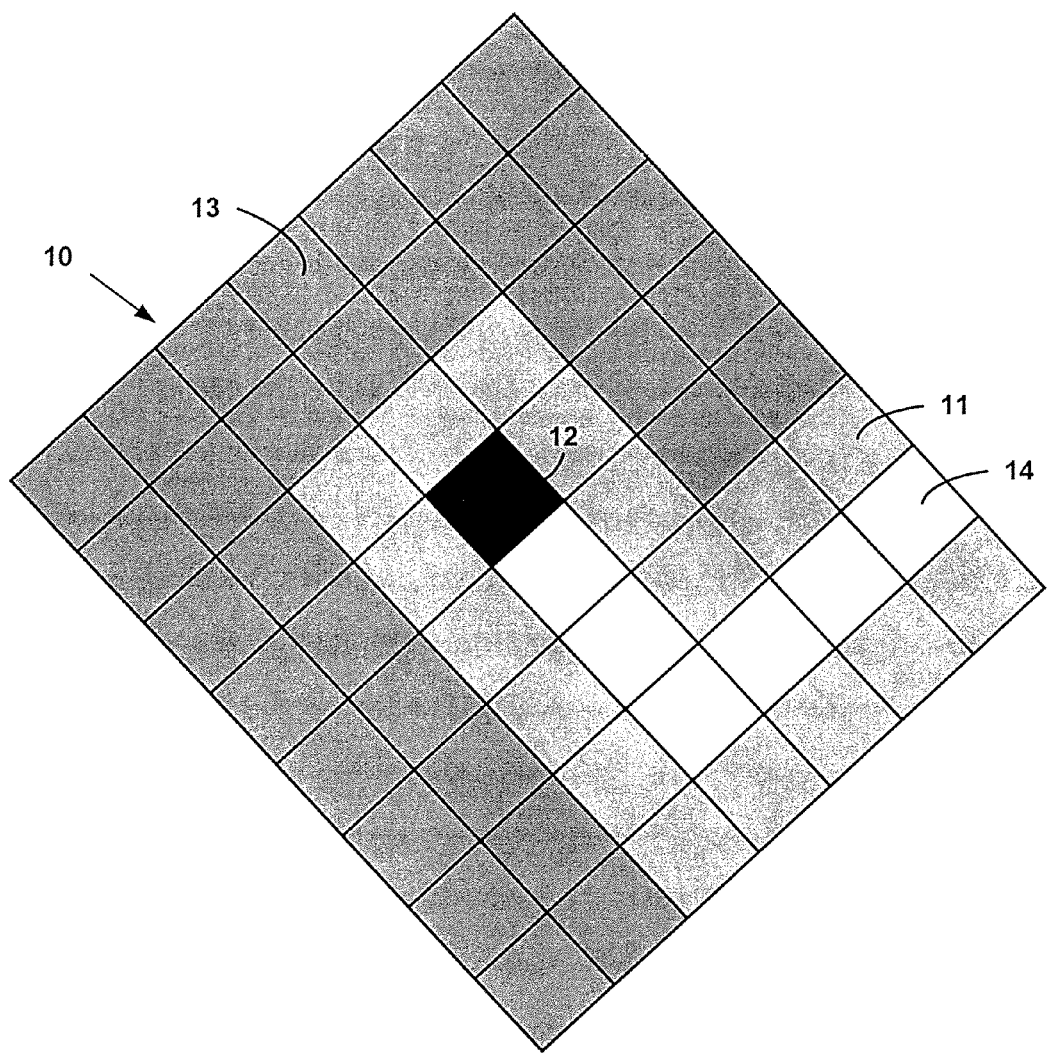
FIG. 1 discloses an exemplary mapped grid under an embodiment of the present invention.

An example of an NIV layout is shown in FIG. 1. The mapping of NIV values may be provided for in a location grid layout 10. It is understood that alternate layouts may be employed under the present invention, such as circular, triangular and even layered grids. In FIG. 1, the exemplary grid 10 illustrates a defined area that is partitioned off into regions, blocks, or sets. As the client location is established 12, it may then be mapped out on the location grid 10. The invention may then partition regions near the client location 12, in accordance to the NIV value. For example, in FIG. 1, the clear blocks 14 illustrate common travel areas, where the client frequently occupies. Such regions 14 would be designated a low NIV value (NIV=0). Other regions 11 may also be designated, for example, as less frequented areas, where the NIV value would be in the region of 0<NIV<MAX. Still other regions 13 may be designated as areas not visited by the client (NIV=MAX).

Figure 1A:
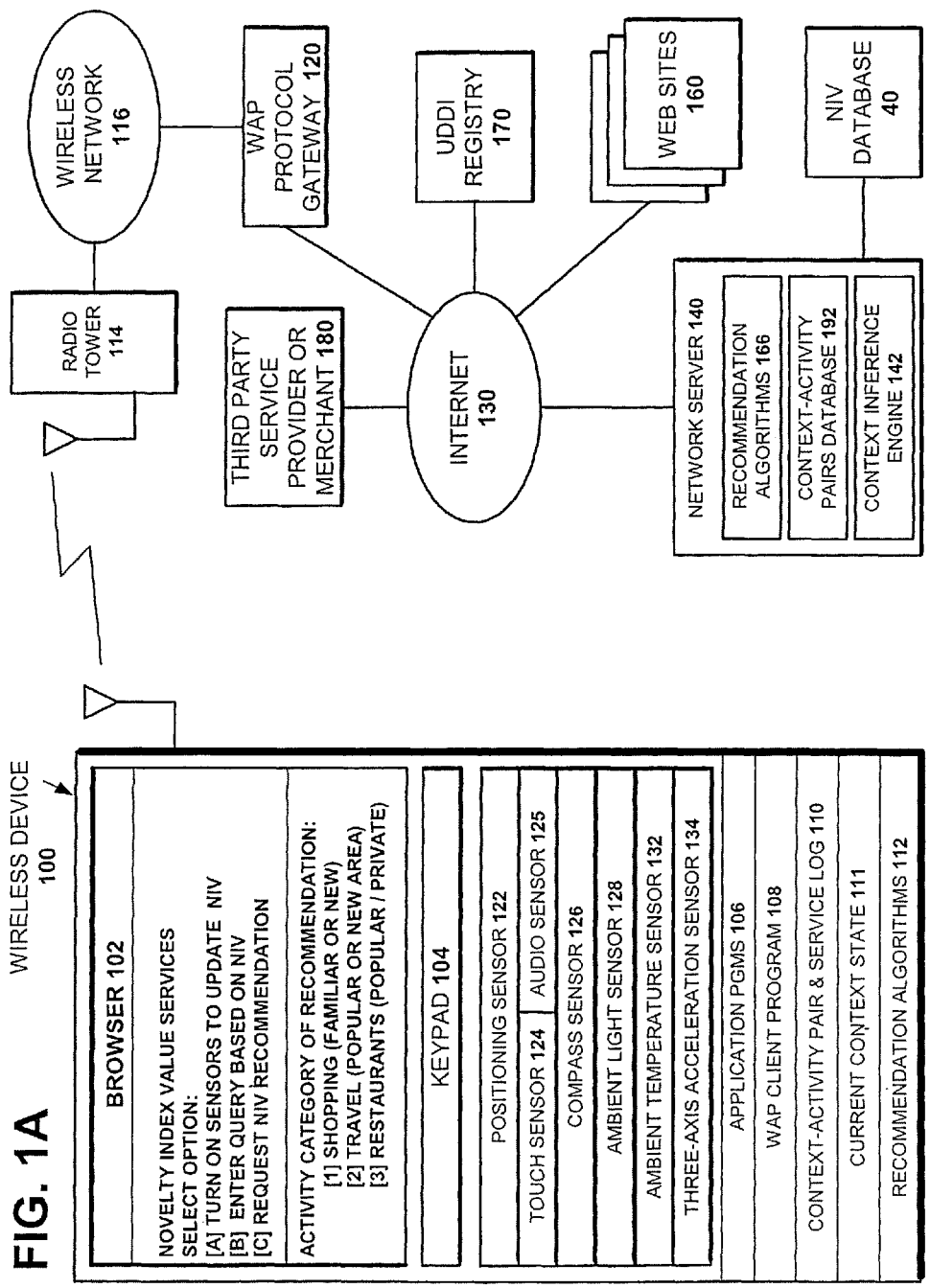
FIG. 1A discloses a combination network diagram and device appearance diagram for a wireless device utilizing a NIV distribution network.
Figure 1B:
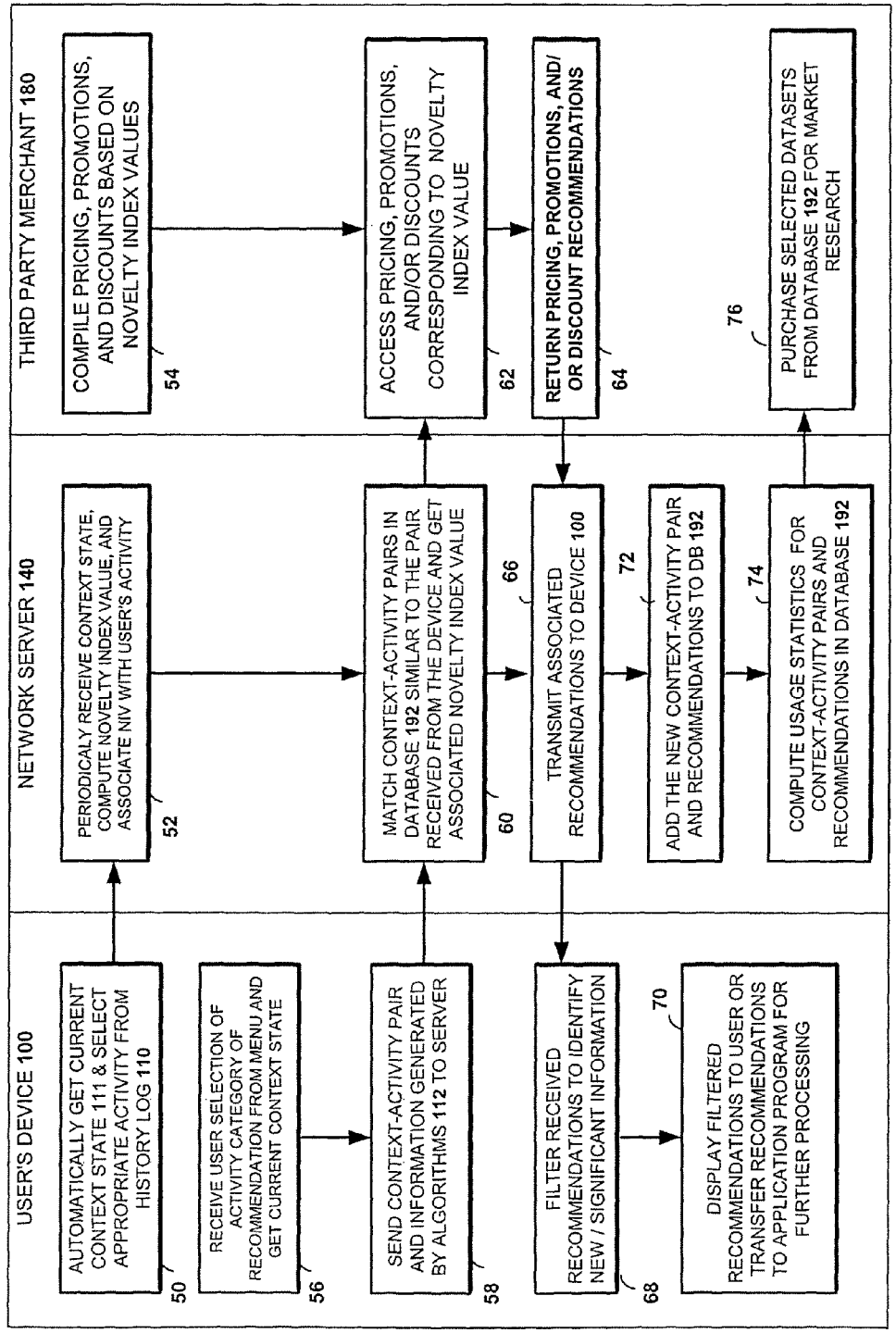
FIG. 1B illustrates a process diagram showing a recommendation network process among a user device, a network server and a third-party merchant.

FIG. 1B illustrates the novelty index value data gathering and novelty index value-based recommendations network process diagram. The network process diagram of FIG. 1B is divided into three columns: user's device 100, network server 140, and a third party merchant 180. Reference back to FIG. 1A illustrates that in a network, the wireless device 100 communicates over a radio frequency link to a radio tower 114 that is connected by means of the wireless network 116 and through a gateway 120 to the Internet 130. Connected to the Internet 130 is a network server 140, which is represented by the center column in FIG. 1B. Also connected to the Internet 130 is the third party service provider or merchant 180, which is represented in the rightmost column of FIG. 1B. The wireless device 100 is represented in the leftmost column of FIG. 1B.

In accordance with the invention, as the user travels about various routes during the day, the wireless device 100 periodically transmits information on the current context of the wireless device 100. That current context information is transmitted from the wireless device 100 through the Internet 130 to the network server 140 and is stored in a novelty index value database 40. This stage of the network process is shown in FIG. 1B beginning with step 50, where the wireless device 100 automatically obtains the current context state of the wireless device and transmits it to the network server 140. If the user has indicated an interest in a particular activity (e.g., shopping, travel, restaurants) at that particular location or context, then that activity category is also transmitted to the network server 140 to be associated with the current context. As is seen in FIG. 1B, step 52 is performed by the network server 140 wherein the server periodically receives the context state, and further computes the novelty index value (discussed in greater detail below). Thereafter, the network server 140 associates the computed novelty index value with the user's activity and stores that information in the novelty index value database 40.

In the meantime, the third party merchant 180 compiles pricing, promotions, and discount information which the merchant wishes to associate with particular novelty index values for a particular user or groups of users. For example, if a prospective customer has never been to the merchant's store, the merchant may want to offer the new customer special discounts, pricing or promotions. The merchant in step 54 of FIG. 1B, stores the compiled pricing, promotion and discount information which has been associated with respective novelty index values, in the novelty index value database 40. To do this, the merchant 180 may communicate over the Internet 130 and through the network server 140 with the novelty index value database 40, shown in FIG. 1A.

During the course of traveling throughout the day, a user may wish to obtain a recommendation, for example, of shopping opportunities at a shopping mall. Accordingly, the user selects on the wireless device 100 of FIG. 1A, the entry (C) REQUEST NIV RECOMMENDATION, and this is followed by the selection of the sub-menu (1) SHOPPING, wherein the user selects new shopping opportunities. Step 56 in FIG. 1B has the wireless device 100 receive the user's selection from the keypad 104 of the device, the user having input the activity category NEW SHOPPING of the recommendation that the user wishes to receive from the NIV network. At the same time, the wireless device 100 interrogates sensors shown in FIG. 1A to compile the current context state for the wireless device 100. The current context state can be as simple as to be directly in conjunction with the geographic location of the wireless device. However, many other ambient signals can be assembled to prepare a more detailed context characterizing the current location of the wireless device. For example, in addition to positioning, information on the ambient sounds, on the orientation of the device, on the ambient light, on the ambient temperature, and other physical environmental values can be gathered by the sensors of the wireless device 100 and assembled into a current context state. A detailed description of how a current context state is computed with the wireless device 100 is given below. It is also understood that the example given of the embodiment is not limited to merchant recommendations and services, but may also be configured to provide news, information, or other similar content.

Step 56 then transitions to step 58 in FIG. 1B, where the context-activity pair and other information generated by the algorithms 112 (FIG. 1A) stored in the wireless device 100 are transmitted to the server 140. Then, step 60 in FIG. 1B has the network server 140 match the context activity pair received from the user's device 100 in a context activity database 192 which has accumulated past context activity pairs. Details of the context activity pair database 192 are provided below. The network server 140 matches the past context activity pairs in the database which are similar to the context activity pair received from the user's device 100 and in response to the search and match, gets the associated novelty index value.

Over the course of using the device 100, the user may make repeated entries of activities of interest. Those activities of interest are correlated with the currently measured context of the device 100, and these context activity pairs are periodically transmitted and stored at the network server 140. The network server 140 stores the context activity pairs in association with the novelty index values in a novelty index value database 40. It is from this database 40 that the network server 140 obtains the novelty index value for the nearest match. T The novelty index value for the nearest match in step 60 is then transmitted from the network server 140 to the third party merchant 180, where, in step 62, the merchant 180 receives the novelty index value. In step 62, the merchant accesses the corresponding pricing, promotions and/or discounts from the merchant's database. The merchant also accesses pricing, promotions and/or discounts corresponding to the novelty index value received from step 60, from the network server 140. Then the process flows to step 64 where the third party merchant 180 returns the pricing, promotions, and/or discount recommendations to the network server 140. Step 66 in the network server 140 of FIG. 1B then transmits the associated recommendations to the device 100.

Step 68 of the user's device 100 in FIG. 1B receives the associated recommendations from the network server 140 and then performs a filtering operation of the received recommendations to identify new and/or significant information. Additional description of this step is provided below. Then the process flows to step 70 wherein the user's device 100 displays the filtered recommendations to the user, as requested. For example, if the user is traveling to a new shopping mall and has entered the shopping mall, the merchant or merchants 180 in the shopping mall can provide appropriate pricing, promotion and/or discounts to the user based on a user's NIV value. Thus a high or low NIV value could trigger special offers from the merchants.

Step 70 in FIG. 1B can also transfer these recommendations to an application program for further processing. An additional feature of the invention is shown in FIG. 1B where the network server 140 transitions from step 66 to step 72 which adds the new context activity pair and recommendations to the database 192. The process then flows to step 74 which computes user statistics for the context activity pairs and recommendations in the database 192. This can become another source of revenue for the network server 140, because the usage statistics can then be marketed to third party merchants such as the merchant 180 who would, in step 76 of FIG. 1B, purchase selected data sets from the database 192 for additional market research purposes. In an alternate embodiment of the invention, step 58 can transmit the context activity pair and information gathered by the algorithms 112 to the server using user privacy protocols.

Figure 2:
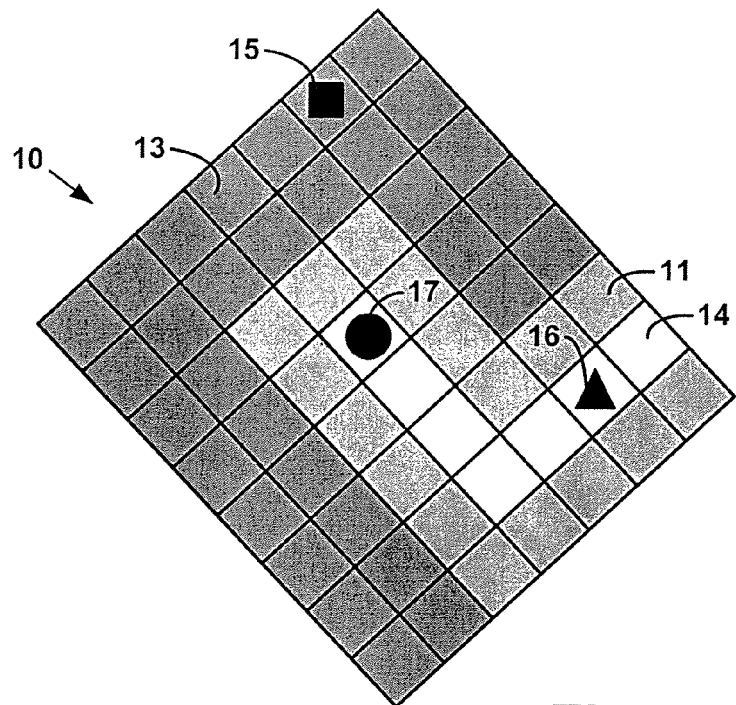
FIG. 2 discloses an application using a exemplary mapped grid under an embodiment of the present invention.

It is understood that the NIV value is capable of being combined or calculated along with other factor values that are provided from sensors that are communicatively coupled to the device. The sensor information would be particularly useful for merchants to learn with greater specificity the reasons behind particular NIV values. Since a user's NIV may be unrelated to reasons of commerce (e.g., a shop is located nearby a user's bus terminal), it would be important to give the owner additional sensor information to better understand the user's behavior. For example, ambient temperature/pressure/humidity, ambient noise, compass, ambient light, wireless device activity, etc. may all be combined in various forms to add context to a NIV reading. Furthermore, user feedback in response to An application of a grid that would be used to establish NIV values is shown in FIG. 2 in the context of an augmented reality shopping space. Under the embodiment, the augmentations are customized according to user's moving behavior between places. Some of the augmentations are located in the common traveling routes 14, where a user's routes are established. A shopping center or a virtual trading place 17 is affixed to the grid, where the user may buy or sell items. Some of the augmentations may also be promotional items 15 and placed outside the common walking routes 11, 14. The promotional items may be evident to the user, or may be affixed in secret, where the user would have to solve a series of clues or hints 16 in order to find and redeem the promotional item 15. Thus the NIV values can also be used as elements that control the nature of the grid. For instance, in the virtual trading place 17, the prices might follow the NIV value of the location so that the prices are higher when the user visits the place often and when he/she does not visit the place for a while, the prices will go down again.

A user can also be categorized according to the location occupied by the user. If a user goes to a shopping mall often, the user's NIV value for that area will be small. The small NIV value would qualify the person to be categorized as a regular customer by the shop or mall that the user visits. As a result, the shop or mall may authorize the user for special discounts or bonuses. On the other hand if the user has a high NIV value (i.e., the user is not a regular customer), the mall or shop may offer introductory discounts to entice the user to physically visit the store. By monitoring such changes in the user NIVs, the shop gains valuable information on user interests towards the shop, or whether that interest is rising or falling.

Figure 2A:
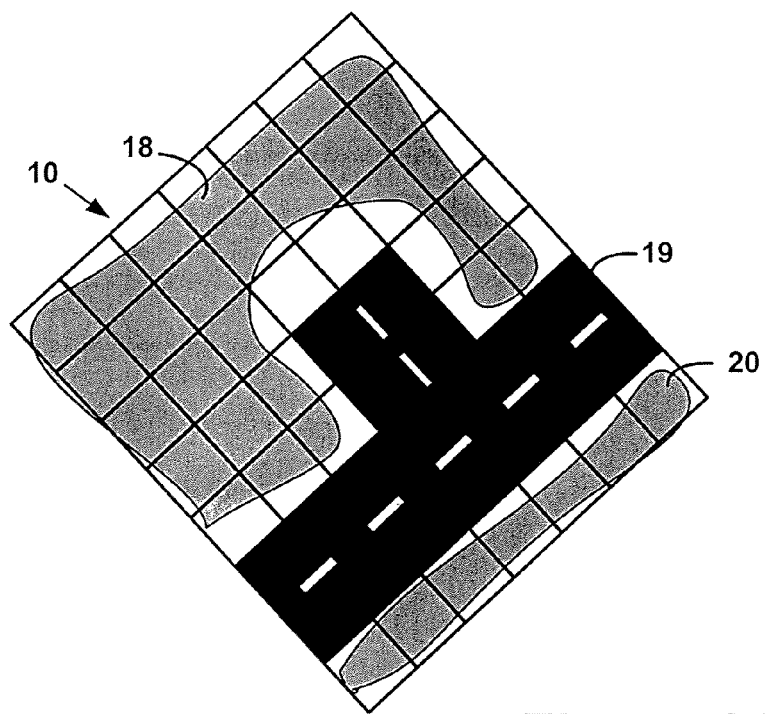
FIG. 2A discloses a superimposed map on a exemplary mapped grid under an embodiment of the present invention.

An example of a "real-world" application is illustrated in FIG. 2A, where the grid 10 is superimposed on a walkway or road 19 and the surrounding geographical area 18, 20. The geographical maps may be developed on a proprietary basis, or may alternately be acquired from existing electronic mapping services. Assuming in FIG. 2A that the geographical areas are a mall 18 and a strip mall 20, shop owners in the mall 18 or strip mall 20 may monitor customer movements, and apply any commercial incentives (e.g., regular customer discounts or introductory discounts) to the customers.

In another embodiment of the invention, a method runs a program in a second terminal to determine a result that depends on the novelty index value. It does this by accessing with the second terminal the database for information associated with the novelty index value and computing the result using the information. Multiple external users may monitor the NIV value of a particular user as well. Monitoring by other users requires that the NIV-database be accessible to the other users. This feature can also be built into the device itself, or may be set in a remote device or location. For example, the device can monitor the NIV-value, and if the value has been MAX for a predetermined period of time (meaning the user has been in a new area), a notification signal is transmitted to a remote device.

An alternate application can be set in the context of a child-monitoring system. Parents are usually very worried about their small children, so the system can be used to warn parents when the child goes into an area that the child has previously not visited. If the NIV has been at a large value MAX for a short while, the child might be classified as lost and a phone call may be automatically initiated. The system can thus act as a care-taker when the parent cannot be with the child. This embodiment helps users monitor travelling behavior to learn how novel a place is relative to the user being monitored. The augmented reality services can further use this information to customize and/or build the augmented data inside and around the user's common routes. Thus parents or teachers will be enabled to monitor children according to school property boundaries or travelling paths. Children that stray beyond permitted limits would set off an alarm to notify the parent or teacher that a travelling violation has occurred.

Figure 3:
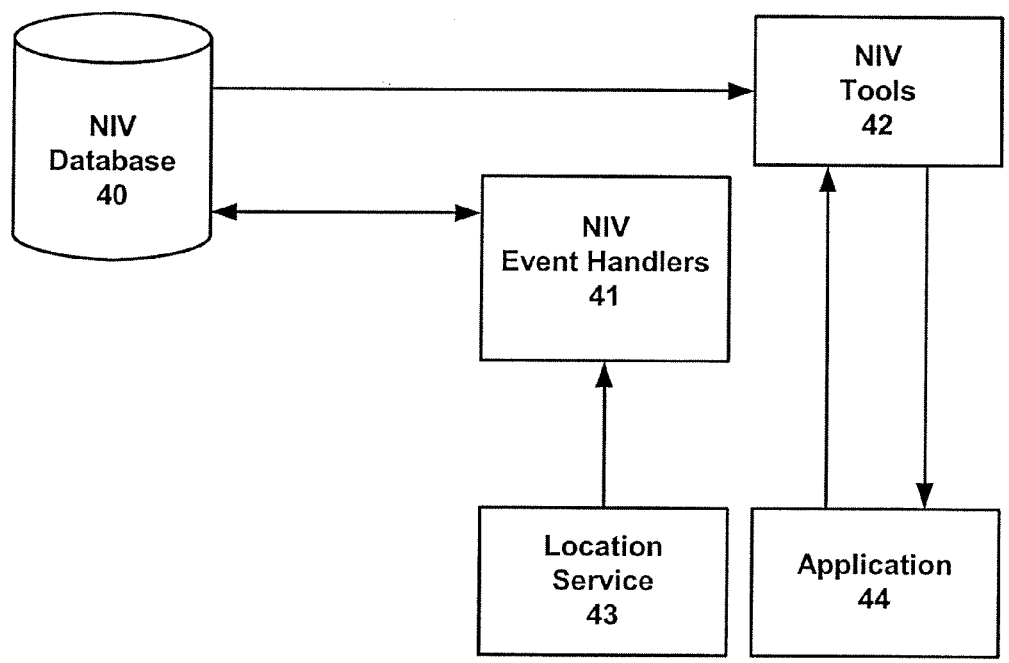
FIG. 3 discloses a system architecture under an embodiment of the present invention.

FIG. 3 discloses an embodiment of the system architecture of the present invention. Disclosed is a NIV database 40, which may transmit NIV values for processing to NIV Program Tools 42. The NIV Tools 42 are preferably disposed in a Network server 140 (shown in FIG. 5), or may be partitioned off in a wireless device. An application program 44, preferably disposed in the wireless device 100, utilizing the NIV system may transmit NIV queries through the NIV Tools 42, wherein the Tools 42 send back the requested information. Updates from the Database 40 are transmitted to NIV Event Handles 41, which are in contact with Location Service 43. Both the Location Services 43 and the Applications Program 44 may be set within the user's wireless device 100 as well.

The NIV is typically configured so that when NIV "events" occur, a system response is requested or automatically invoked. These events include a user entering a location (enter_loc), leaving a location (leave_loc), or returning to a location (update_loc). The NIV is defined for each location based on information as to how often user has been in that location and how much time has passed since the previous visit to that location. Each location handles update_loc and leave_loc events per each user. When a user enters a location, the enter_loc event is triggered. When the location is departed, the leave_loc event is triggered. Each time the enter_loc is triggered, the current NIV is calculated for that location and user. If a location does not have a NIV value, the NIV value is assumed as MAX. Each time the leave_loc is triggered the NIV value for the location and user is updated and the NIV value is marked with a time stamp using a global time notation, such as UTC. The time is converted to values that can be used in base 10 calculations, such as expressing a time differ in seconds using a date Jan. 1, 2000 and a time 00:00.00.

The database uses the location grid to reduce the amount of NIV data that is utilized by the system at one time. When a enter_loc or leave_loc event is sent to the NIV system, it trims the location coordinates to the location grid. The size of one location is defined in the top level of the NIV database, with a default value set under location_grid_size. The location grid size can be chosen according to the error tolerance of the location service and amount of storage space available for the data. To further illustrate an embodiment of the present invention, the text below and the associated tables discuss a method of utilizing the NIV system in the embodiment.

Typically, the system's data collection works through the following steps: (1) the device obtains the user's location (e.g., GPS); (2) the location is sent to the NIV system; and (3) the NIV system trims the location to its location grid and updates the user's current grid value. Regarding system queries, the query is typically sent to the NIV system, where the NIV system processes replies to the query accordingly. An example of the events utilized in the system is tabulated below:

[1] EVENT: update_loc(user,location,time)

| | |
|---|---|
| $NIV_{(user, location)}$ | Updated NIV value |
| $NIV0_{(user, location)}$ | Previous NIV value |
| NIV AGING RATE | The rate at which the NIV value is incremented over time, for the length of time the device is absent from the location. |

$$NIV_{(user, location)} = [NIV0_{(user, location)}] + [\text{delta\_time\_absent}] * NIV\_AGING\_RATE$$

where delta_time_absent=current_time−time_last_updated (location).

In order to keep the NIV value within a prescribed grid, if the updated NIV value $NIV_{(user, location)}$ exceeds the maximum value (MAX), the $NIV_{(user, location)}$ value is deleted from a NIV database. However, if $NIV0_{(user, location)}$ is not defined in the $NIV_{(user, location)}$ (i.e., the user is entering the grid for the first time), the NIV value is assumed as a value MAX. Furthermore, if user movements are not defined for the location, it is assigned a default value NIV_AGING_RATE.

[2] EVENT: leave_loc (user, location)

| | |
|---|---|
| <NIV_rate_decrease> | The rate at which the NIV is decreased in value each time an enter_loc event occurs |
| <NIV_rate_increase> | The rate at which the NIV is increased in value in the absence of an enter_loc event. |

-continued

| <MAX> | The maximum NIV value |
| <User> | The user ID |
| <Accumulation> | Accumulated NIV values |
| <NIV data> | The NIV data |

$$NIV_{(user,location)} = NIV0_{(user,location)} - NIV\_rate\_decrease.$$

In addition to users entering and leaving a location, it becomes important to determine what to do with the NIV values once the users occupy (or fail to occupy) a particular space in the grid. When a device obtains a NIV from a highly frequented area (e.g., the home or office), the NIV values may be disproportionately low relative to other areas visited by the user. In such instances, the NIV_rate_decrease may be used in conjunction with, or independently from the NIV_aging_rate to establish NIV values. Typically, if the updated NIV value $NIV_{(user,\ location)}$ exceeds its minimum value, the $NIV_{(user,\ location)}$ is reset to 0. However, it is also possible under the present invention to specify different NIV_rate_decrease values when an enter_loc event occurs for a particular portion of the grid. If a NIV_rate_decrease is not defined for the location, a default_NIV_rate_decrease value is assigned. Similarly, when a user is absent from an area, a default_NIV_rate_increase is typically assigned.

NIV Data:

| <NIV node 0> | 1$^{st}$ NIV data element |
| <NIV node1> | 2$^{nd}$ NIV data element |
| <NIV nodeN> | Nth NIV data element |

NIV Node:

| <Location_name> | (Optional) Optional unique location descriptor |
| <Novelty Index Value> | Current NIV value |
| <Time_last_updated> | Time the NIV node for last updated |
| <Location_Y> | Location coordinate Y |
| <Location_X> | Location coordinate X |
| <NIV_rate_increase> | The rate at which the NIV is decreased in value each time a enter_loc event occurs |
| <NIV_rate_decrease> | The rate at which the NIV is increased in value in the absence of an enter_loc event. |

The augmented reality services can use NIV system for detecting suitable placements of augmented objects. The queries includes the following:

(1) Find_Suitable_Places (User, Area, $NIV_{min}$, $NIV_{max}$)—Returns a set of suitable places for object that has NIV values inside the range of $NIV_{min}$ ... $NIV_{max}$ for the user. The returned places are real-world coordinates of the NIV grid.

| <User> | The user ID |
| <Area> | Real-world coordinates that defines an rectangular area |
| <NIVmin> | Minimum NIV value accepted |
| <NIVmax> | Maximum NIV value accepted |

(2) Get_Accumulated_NIV(User)—Returns the accumulated NIV value that has been gathered since this query was last used and may further reset the accumulation value to zero.
(3) Get_NIV(User, Location)—Returns the current NIV of a location.
(4) Optimize (User, NIVmax)—Optimizes the use NIV database, by updating the NIV values and deleting the ones that have value higher than NIVmax.

Implementation of a NIV system can be embodied in a NIV server that is run from a mobile device. When the user subscribes to an augmented reality service, the service can query for suitable places for each augmented object. Since the data storage of a mobile phone is quite limited, the Optimize query option can be used to reduce the storage requirements. Choosing a larger or smaller location grid size for the user would help minimize database storage issues. Alternately, the NIV server can also be run remotely and the mobile device would send location updated to the sever. SIP technology can also be used for sending the NIV updates to the server in case the NIV database resides in a remote server. The NIV queries might use a Service Provider interface (SIP) in cases where the NIV database resides in the mobile device. The SIP technology enables the mobile phone to receive and send wireless messages to/from the NIV system.

Figure 4:
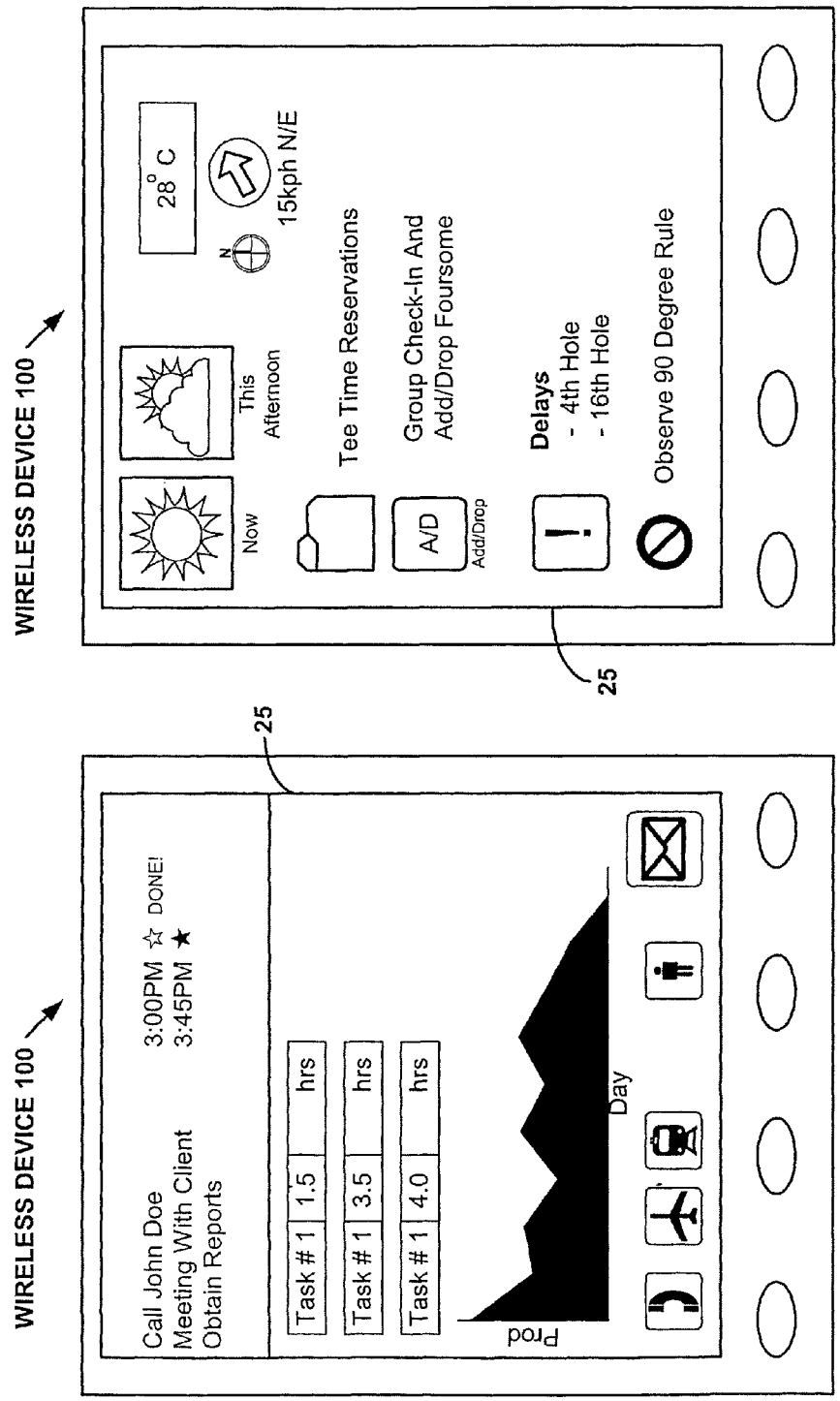
FIG. 4 discloses an embodiment of the invention showing a user screen using a NIV device configuration.

An alternate embodiment allows the system to also change a configuration of a wireless device as well using the NIV system. In FIGS. 4 and 4A, a user's wireless device is shown 100 as well as a user display 25. In FIG. 4, the user may have the wireless device 100 automatically configured to an NIV or location value, wherein an application program or display is automatically configured for that location, in the example of FIG. 4, the user has a display configured to a work application that is loaded into the device when the device is located at the user's workplace. Various applications (corporate, third-party, or user-defined) are set in the device, where the user may view or interact with those applications. As the user moves about, the device may be configured to load alternate applications at specified locations. In the example of FIG. 4A, the user arrives at a golf course after work, wherein a different application is automatically loaded into the wireless device 100, and displayed on the screen 25. The user may now view and interact with the newly-loaded application at the new location (i.e., the golf course). The user may further specify which features of the applications are activated when the application is loaded and executed.

Figure 5:
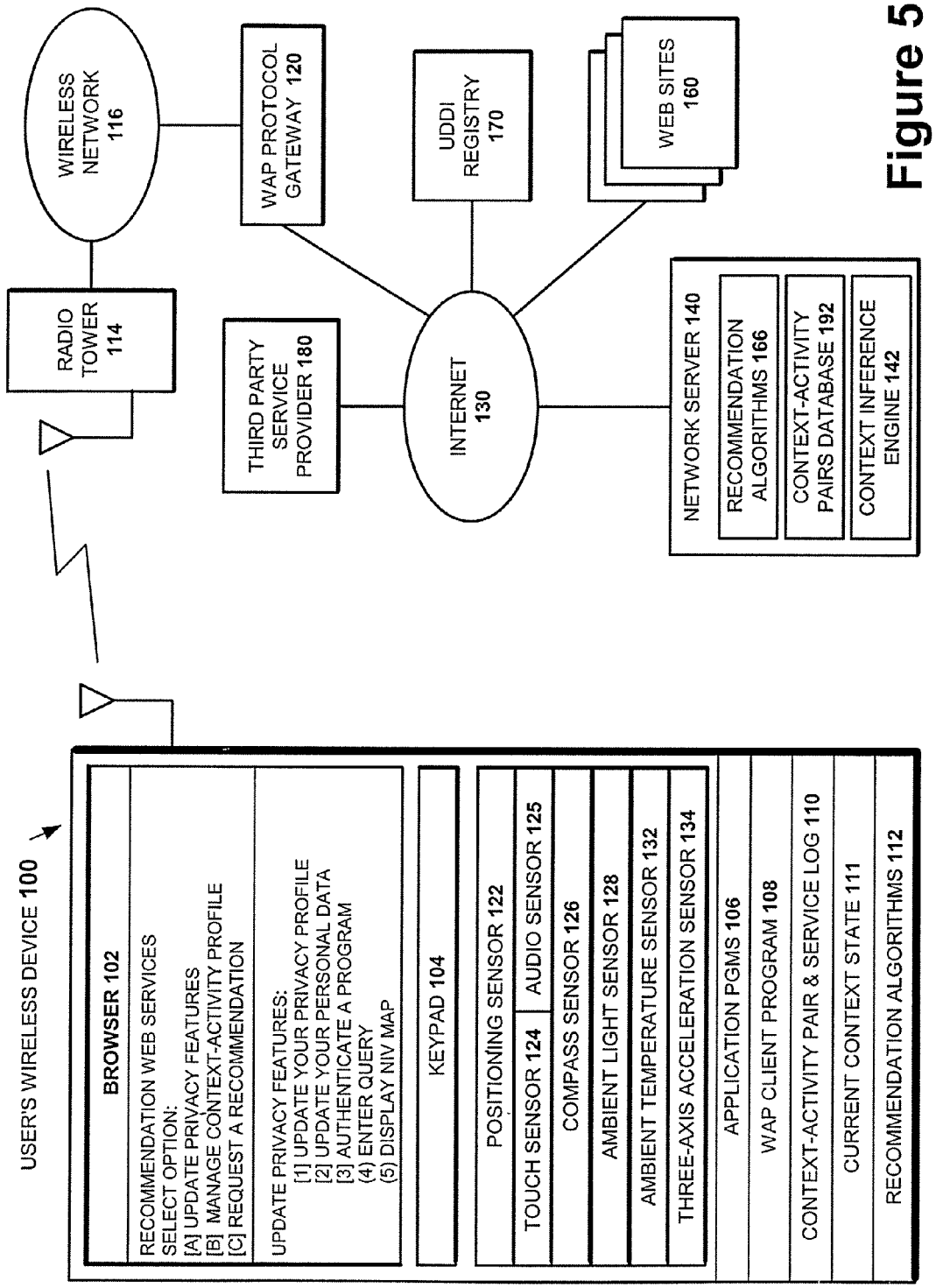
FIG. 5 is a network diagram of the invention, showing an example relationship between the user's Wireless Application Protocol (WAP)-enabled portable wireless device, the WAP protocol gateway to the Internet, the network server, a third party service provider, the Universal Description, Discovery and Integration (UDDI) registry, and a plurality of web sites.

FIG. 5 illustrates a network diagram that shows an exemplary relationship between the user's Wireless Application Protocol (WAP)-enabled portable wireless device 100, the network server 140, and the third party service provider 180, interconnected over the Internet 130. The invention is applied to wireless telephones and wireless personal digital assistants (PDAs) implementing the Wireless Application Protocol (WAP) standard. Other protocols that can be used in the invention to access the Internet include I-Mode protocol and mobile IPv6 protocol. FIG. 5 shows the user's wireless device 100 communicating over a radio link with the radio tower 114, which is connected to a wireless network 116, which is connected to a WAP protocol gateway 120. The gateway 120 is connected over the Internet 130 to the server 140. The user's WAP-enabled portable wireless device 100 can be a wireless mobile phone, pager, two-way radio, smartphone, personal communicator, or the like. The user's WAP-enabled portable wireless device 100 accesses a small file called a deck which is composed of several smaller pages called cards which are small enough to fit into the display area of the device's microbrowser 102. The small size of the microbrowser 102 and the small file sizes accommodate the low memory constraints of the portable wireless device 100 and the low-bandwidth constraints of a wireless network 116. The cards are written in the Wireless Markup Language (WML) which is specifically devised for small screens and one-hand navigation without a keyboard. The WML language is scaleable from two-line text displays on the microbrowser 102 of a cellular telephone, up through large LCD screens found on smart phones and personal communicators. The cards written in the WML language can include programs written in WMLScript, which is similar to JavaScript, but makes minimal demands on memory and CPU power of the device 100 because it does not contain many of the unnecessary functions found in other scripting languages.

The Nokia WAP Client Version 2.0 is a software product containing the components necessary to implement a WAP client 108 on the wireless device 100. These components include a Wireless Markup Language (WML) Browser, WMLScript engine, Push Subsystem, and Wireless Protocol Stack. The Nokia WAP Client is a source-code product that can port and integrate into wireless devices such as mobile phones and wireless PDAs. Application programs 106 stored in the wireless device 100 interact with the WAP Client 108 to implement a variety of communications applications. Details of the Nokia WAP Client Version 2.0 can be found in the online paper: *Nokia WAP Client Version 2.0, Product Overview*, Nokia Internet Communications, 2000, www. nokia.com/corporate/wap.

The WAP Client 108 includes Wireless Public Key infrastructure (PKI) features, providing the infrastructure and the procedures required for authentication and digital signatures for servers and mobile clients. Wireless PKI is a certificate-based system that utilizes public/private key pairs associated with each party involved in a mobile transaction. Wireless Identity Module (WIM) is a security token feature of the WAP Client 108, which includes security features, such as the public and private keys and service certificates, needed for user authentication and digital signatures. Additionally, it has the ability to perform cryptographic operations to encrypt and decrypt messages.

The wireless device 100 of FIG. 5 also has a plurality of sensors for sensing the mobile user's ambient conditions. The sensors shown include POSITIONING SENSOR 122, TOUCH SENSOR 124, AUDIO SENSOR 125, COMPASS SENSOR 126, AMBIENT LIGHT SENSOR 128, AMBIENT TEMPERATURE SENSOR 132, and THREE-AXIS ACCELERATION SENSOR 134. The audio sensor 125 can be a microphone, for example, which can detect speech or environmental sounds. The positioning sensor can be, for example, a GPS receiver integrated in the device. The positioning sensor can also be, for example, a radio beacon triangulation sensor that determines the location of the wireless device by means of a network of radio beacons, base stations, or access points, as is described for example, in Nokia European patent EP 0 767 594 A2, entitled "Mobile Station Positioning System". These sensors provide inputs which are sampled by the wireless device 100 to infer a current context, as will be described below.

The WAP protocol gateway 120 links the Internet 130 and the wireless network 116. The WAP protocol gateway 120 includes the Wireless Public Key infrastructure (PKI) feature to help provide a secure Internet connection to the wireless device 100. The WAP protocol gateway 120 enables the WAP-enabled wireless device 100 to access Internet applications such as headline news, exchange rates, sports results, stock quotes, online travel and banking services, or to download distinctive ringing tones.

The user's WAP-enabled portable wireless device 100 communicates with the radio tower 114 and can exchange messages for distances up to several kilometers. The types of wireless networks 116 supported by the WAP standard include Cellular Digital Packet Data (CDPD), Code-Division Multiple Access (CDMA), Global System for Mobile Communications (GSM), Time Division Multiple Access (TDMA), GPRS, 3G-Broadband, and the like.

The overall process of communication between the user's WAP-enabled wireless device (the client) 100, through the WAP protocol gateway 120, to the server 140 resembles the way Web pages are served on the Internet using the HyperText Transfer Protocol (HTTP) or World Wide Web protocol:

[1] The user presses a phone key on the user's device 100 related to the Uniform Resource Locator (URL) of the server 140.
[2] The user's device 100 sends the URL, via the radio tower 114 and the wireless network 116, to the gateway 120 using WAP protocols.
[3] The gateway 120 translates the WAP request into an HTTP request and sends it over the Internet 130 to the server 140, via Transmission Control Protocol/Internet Protocol (TCP/IP) interfaces.
[4] The server 140 handles the request just like any other HTTP request received over the Internet. The server 140 either returns a WML deck or a HyperText Markup Language (HTML) page back to the gateway 120 using standard server programs written, for example in Common Gateway Interface (CGI) programs, Java servlets, or the like.
[5] The gateway 120 receives the response from the server 140 on behalf of the user's device 100. If the response is an HTML page, it is transcoded into WML if necessary. Then the WML and WMLScript coding is encoded into a byte code that is then sent to the user's device 100.
[6] The user's device 100 receives the response in WML byte code and displays the first card in the deck on the microbrowser 102 to the user.

In FIG. 5, the protocol gateway 120 includes a WAP protocol stack organized into five different layers. An application layer is the wireless application environment, which executes portable applications and services. A session layer is the wireless session protocol, which supplies methods for the organized exchange of content between client/server applications. A transaction layer is the wireless transaction protocol, which provides methods for performing reliable transactions. A security layer is the wireless transport layer security, which provides authentication, privacy, and secure connections between applications. The transport layer is the wireless datagram protocol, which shelters the upper layers from the unique requirements of the diverse wireless network protocols, such as CDPD, CDMA, GSM, etc. Additional information about the WAP standard and the WAP protocol stack can be found in the book by Charles Arehart, et al. entitled, "Professional WAP", published by Wrox Press Ltd., 2000 (ISBN 1-861004-04-1).

In FIG. 5, the user's portable wireless device 100 includes the microbrowser 102 and displays the Recommendation Web Services menu, to enable the user to navigate through the cards being displayed and to select options that are programmed by the application programs 106. The user's device 100 also includes the WAP client program 108 which has been previously discussed.

The microbrowser 102 and the user's wireless device displays a recommendation web services menu. The recommendation web services menu provides the user with options to select: (A) UPDATE PRIVACY FEATURES; (B) MANAGE CONTEXT-ACTIVITY PROFILE; AND (C) REQUEST A RECOMMENDATION.

The user's wireless device 100 includes application programs 106, the WAP client program 108, context-activity pair and service history log 110, current context state 111 and recommendation algorithms 112. The network server 140 includes recommendation algorithms 166, context-activity pairs database 192, and context inference engine 142. The context-activity pairs database 192 may also be linked to a feedback mechanism in the server (not shown), wherein user responses to particular recommendations may be monitored.

Figure 6:
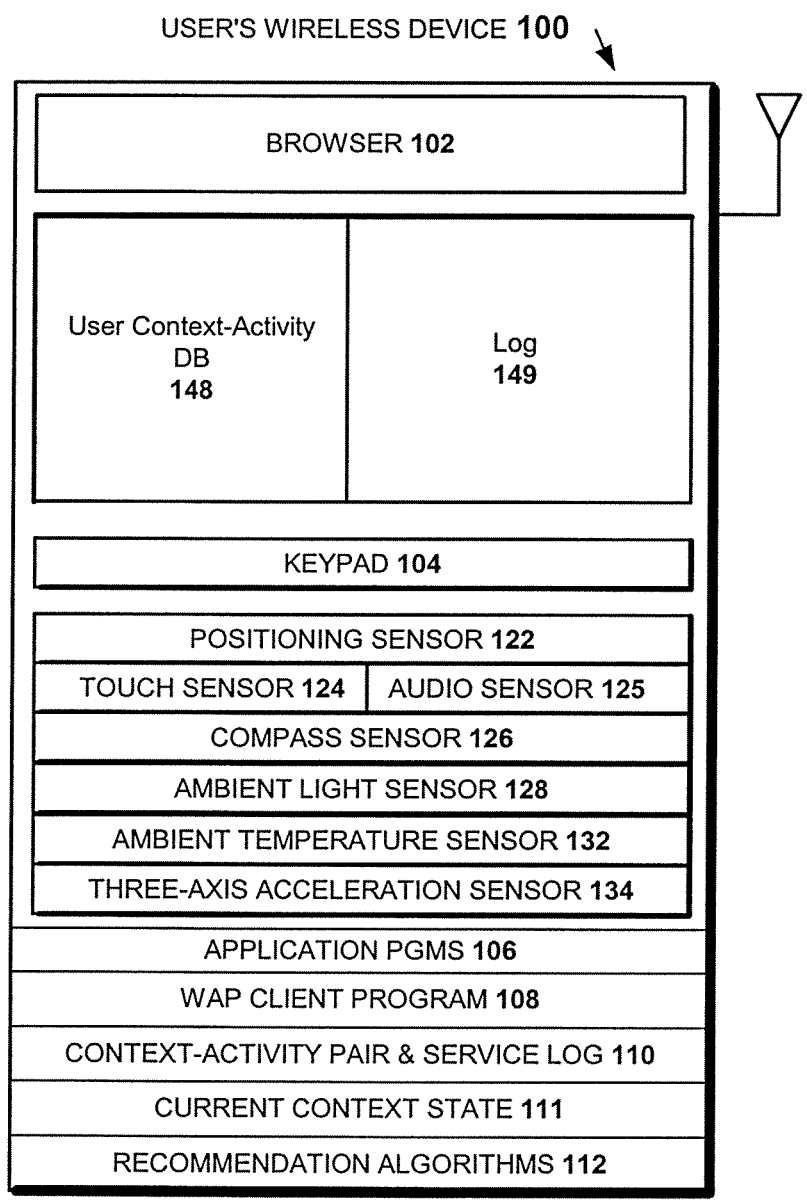
FIG. 6 discloses an embodiment of the invention wherein a user recommendation database is located within a wireless device.

FIG. 6 discloses an alternate embodiment of the user wireless device 100 as disclosed in FIG. 5. The user's wireless device 100 includes application programs 106, the WAP client program 108, context-activity pair and service history log 110, current context state 111 and recommendation algorithms 112. In addition, a user context-activity database 148 and user log 149 are incorporated into the wireless device 100. The user context-activity database 148 serves to complement or alternately replace the context-activity database 192, depending on the application. The user log database 149 temporarily stores or caches user context activity, and further communicates with the user context activity database 148 to provide local device processing of recommendations through recommendation algorithms 112.

Figure 6B:
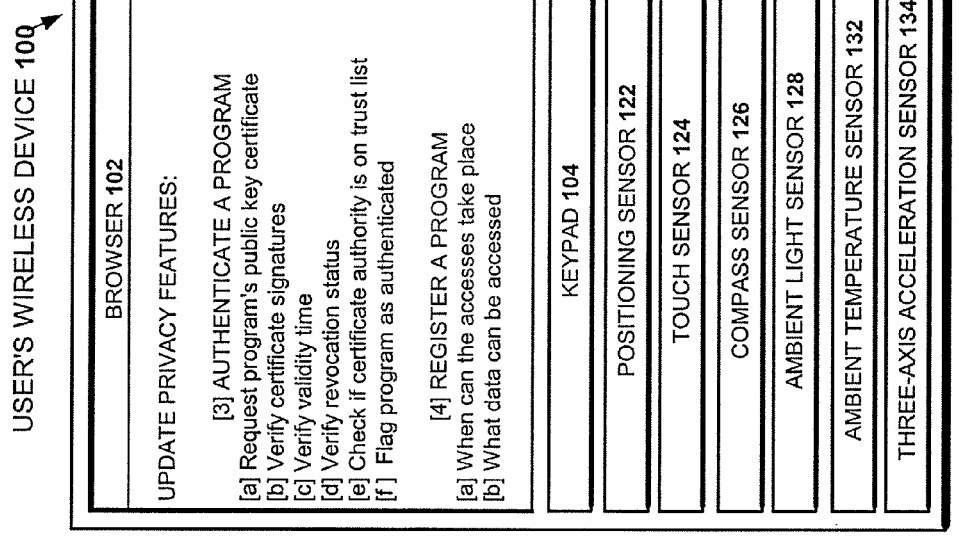
FIGS. 6A and 6B show the user's wireless device with the UPDATE PRIVACY FEATURES: sub-menu of the Recommendation Web Services menu.
Figure 6A:
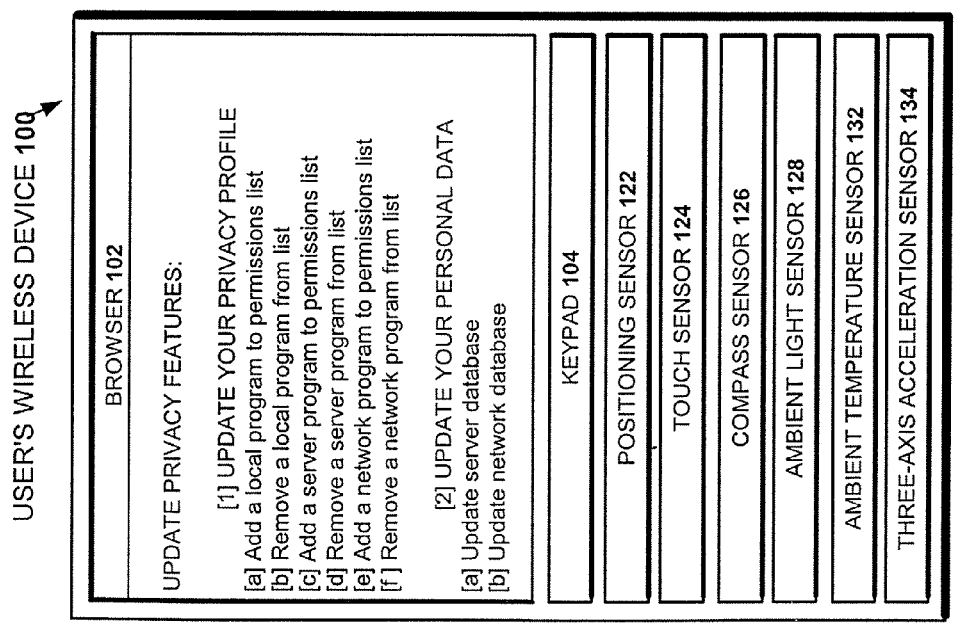
Figures 6C, 6D:
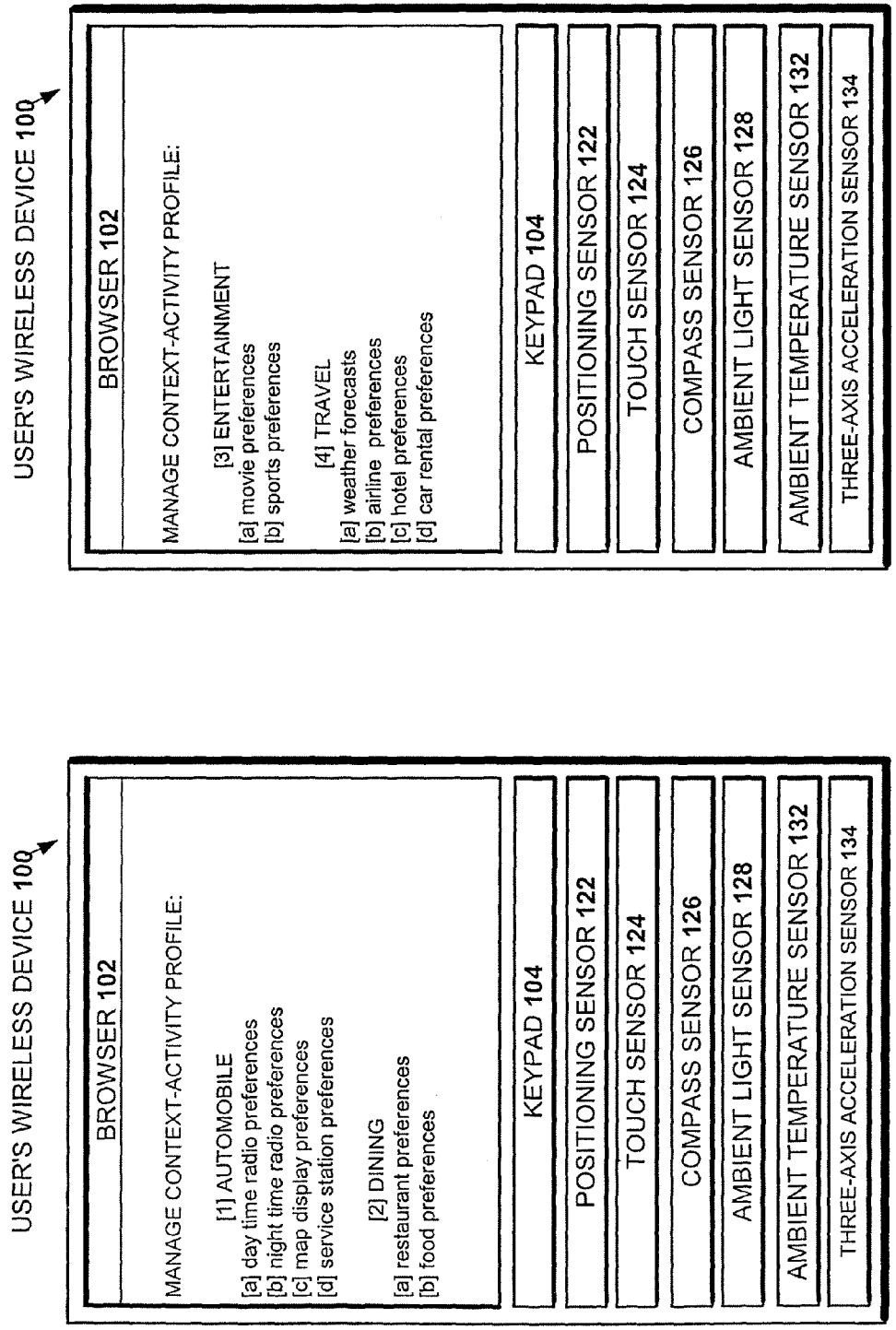
FIGS. 6C and 6D show the user's wireless device with the MANAGE CONTEXT-ACTIVITY PROFILE sub-menu of the Recommendation Web Services menu.
Figures 6E, 6F:
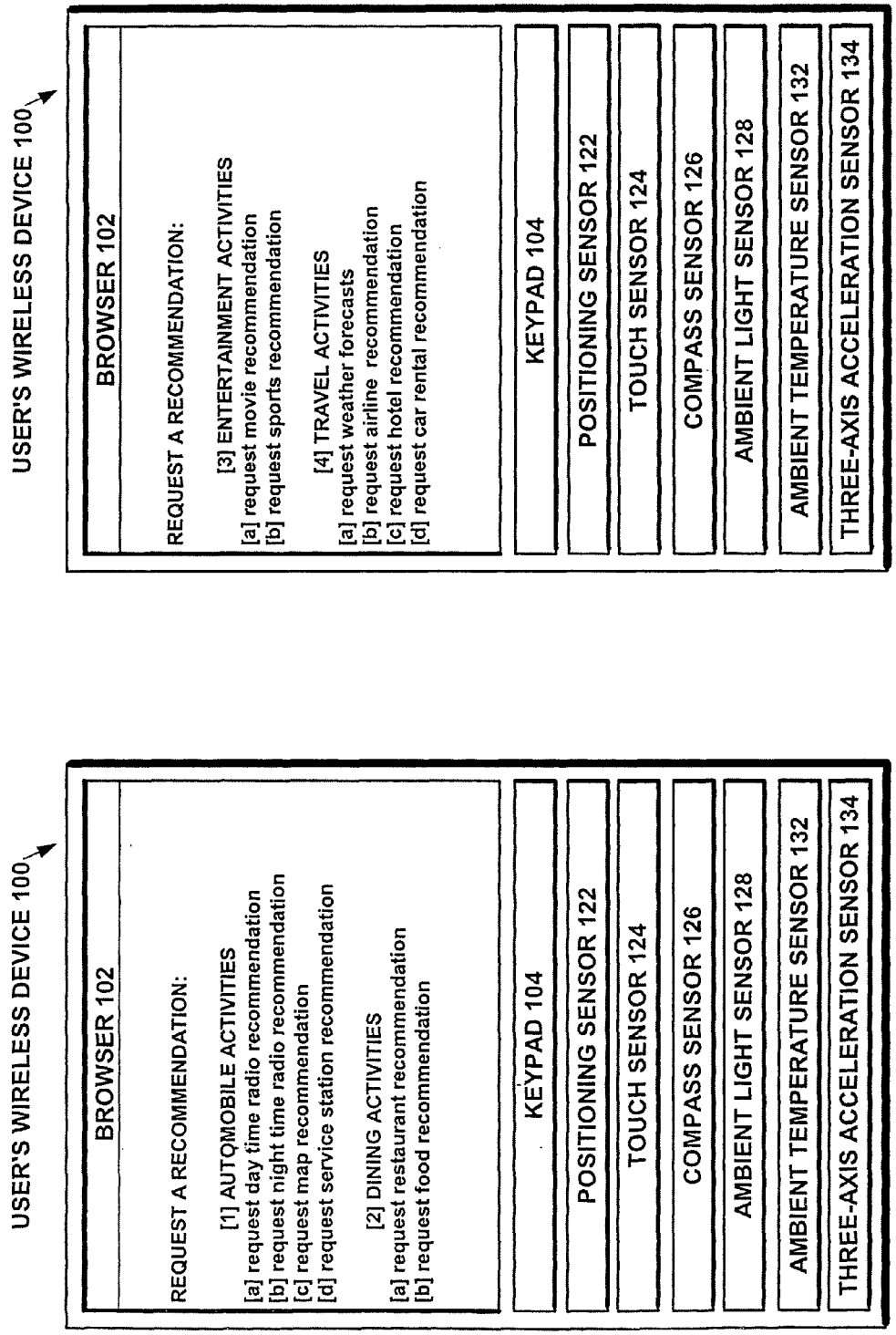
FIGS. 6E and 6F show the user's wireless device with the REQUEST A RECOMMENDATION sub-menu of the Recommendation Web Services menu.
Figures 6G, 6H:
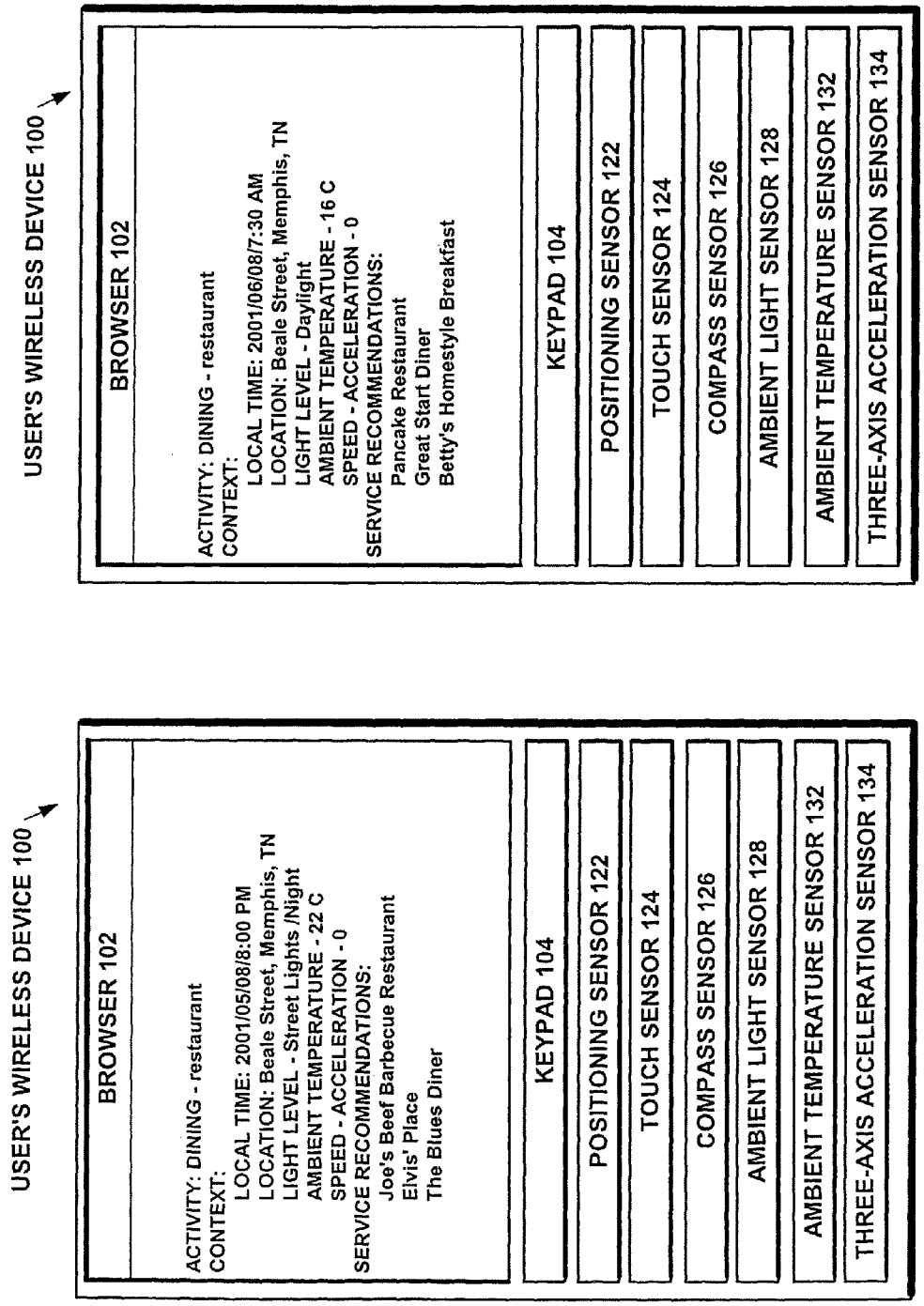
FIGS. 6G and 6H show two examples of the user's wireless device with a requested context-activity pair which is sent to the network server and the resultant service recommendations received back from the server.

FIGS. 6A and 6B show the user's wireless device with the UPDATE PRIVACY FEATURES sub menu of the recommendation web services menu. FIGS. 6A and 6B will be discussed further below. FIGS. 6C and 6D show the user's wireless device with the MANAGE CONTEXT-ACTIVITY PROFILE sub menu of the recommendation web services menu. The MANAGE CONTEXT-ACTIVITY PROFILE sub menu offers the user the option of managing preference values for the following categories:

(1) AUTOMOBILE
   (a) day time radio preferences
   (b) night time radio preferences
   (c) map display preferences
   (d) service station preferences
(2) DINING
   (a) restaurant preferences
   (b) food preferences
(3) ENTERTAINMENT
   (a) movie preferences
   (b) sports preferences
(4) TRAVEL
   (a) weather forecasts
   (b) airline preferences
   (c) hotel preferences
   (d) car rental preferences If the user selects the option of (c) REQUEST A RECOMMENDATION, from the recommendation web services menu of FIG. 5, then the REQUEST A RECOMMENDATION sub menu is displayed on the wireless device, as is shown in FIGS. 6E and 6F. The options presented to the user in the REQUEST A RECOMMENDATION sub menu are activity categories. The activity categories are displayed as follows:

(1) AUTOMOBILE ACTIVITIES
   (a) request day time radio recommendation
   (b) request night time radio recommendation
   (c) request map recommendation
   (d) request service station recommendation
(2) DINING ACTIVITIES
   (a) request restaurant recommendation
   (b) request food recommendation
(3) ENTERTAINMENT ACTIVITIES
   (a) request movie recommendation
   (b) request sports recommendation
(4) TRAVEL ACTIVITIES
   (a) request weather forecasts
   (b) request airline recommendation
   (c) request hotel recommendation
   (d) request car rental recommendation If the user selects the option of DINING ACTIVITIES and specifically "request restaurant recommendation" in the browser 102 of FIG. 6E, then the wireless device 100 proceeds to interact with the network server 140, to produce the result of the browser 102 displaying the page shown in FIG. 6G. As is seen in FIG. 6G, the user selected activity of "DINING-restaurant" is coupled with the context that the wireless device 100 determines to exist at the present time in the vicinity of the wireless device 100. The activity coupled with a description of the current context, is transmitted from the wireless device 100 to the network server 140. At the server 140, context-activity pairs in the database 192 are approximately matched to the current context-activity pair received from the device 100, and the server accesses associated recommendations that are stored in the database 192. The associated recommendations are then transmitted back to the device 100. This operation will be discussed in greater detail in connection with FIG. 8A below.

Figure 7:
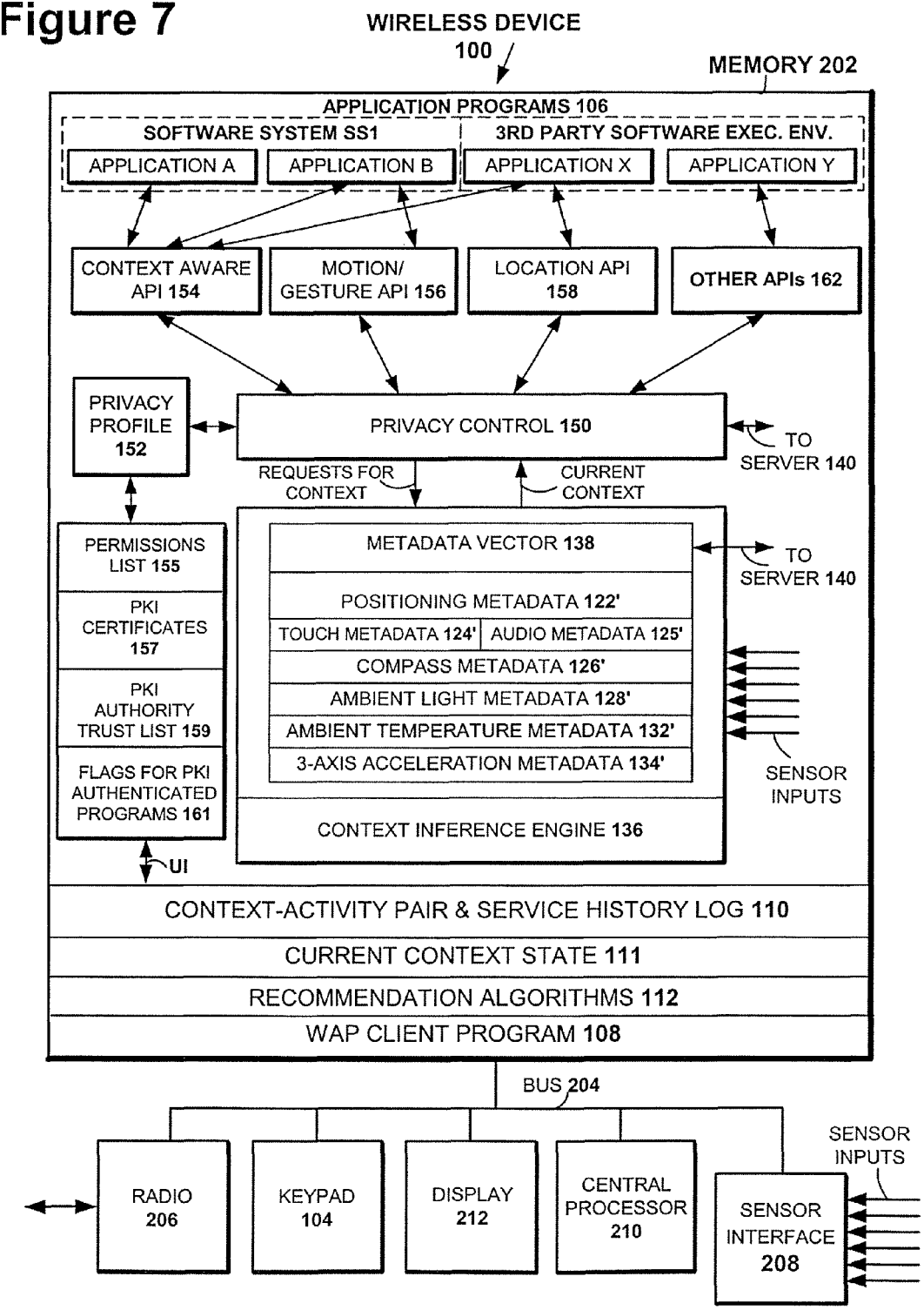
FIG. 7 is a functional block diagram of the wireless device, showing its various components and programs.

Turning now to FIG. 7, a functional block diagram is shown of the wireless device 100, with its various components and programs. A memory 202 of the wireless device 100 is connected by means of a bus 204 to a keypad 104, a radio 206, a sensor interface 208, a central processor 210, and a display 212 which displays the browser 102. The memory 202 stores the context-activity pair and service history log 110, which is shown in greater detail in an example in FIG. 8C. The memory 202 also stores the current context state 111 which includes a description of the environment of the wireless device 100 at the present time. As will be discussed further below, the characterization of the environment of the wireless device 100, includes the metadata vector 138 which includes information relating to the sensor signals input from the sensors at the current time. Also included in the memory 202 are recommendation algorithms 112 which will be discussed further below.

Figure 7A:
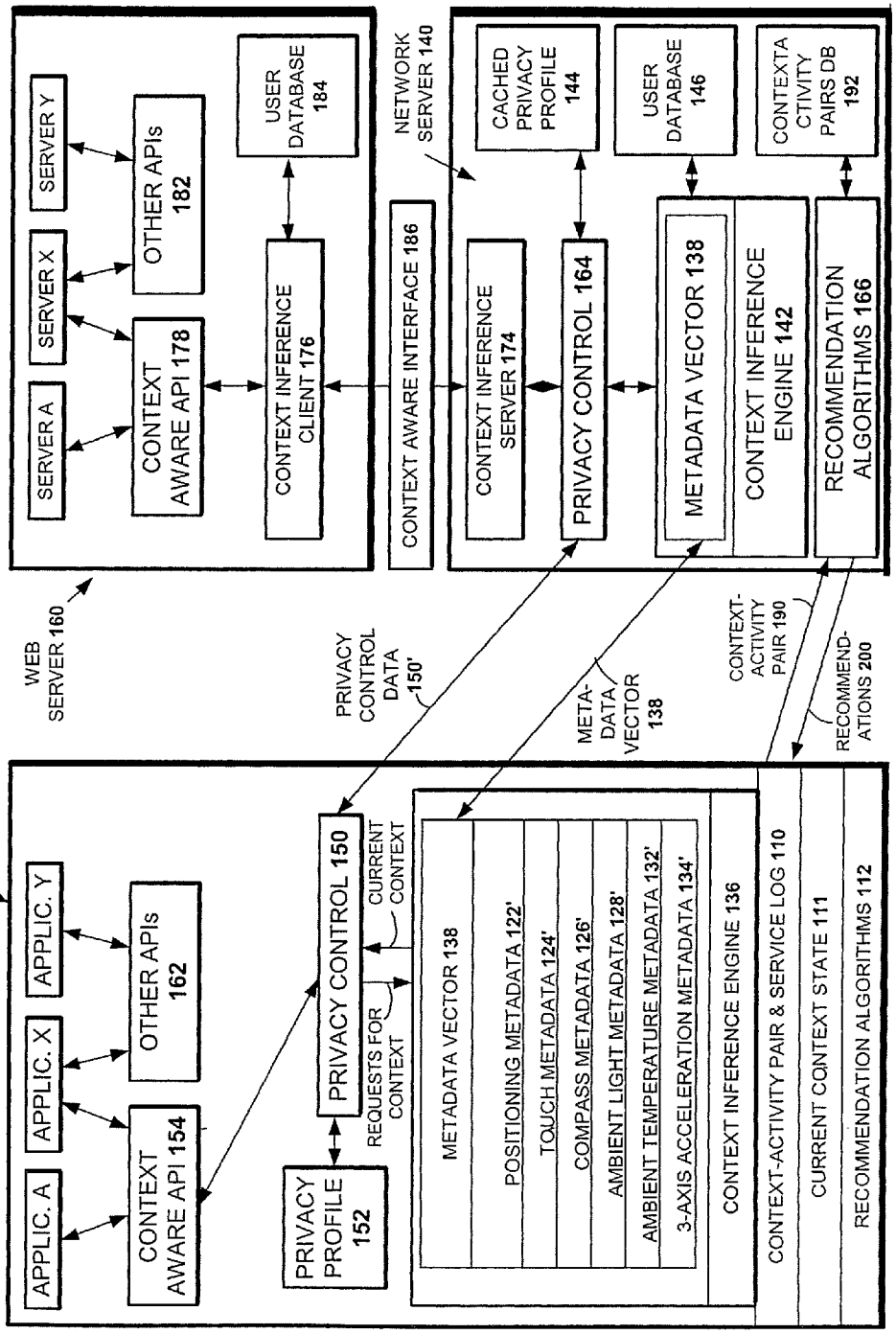
FIG. 7A is a functional block diagram of the wireless device, the server, and the web server 160, and their interaction when exchanging a metadata vector and privacy control data and when exchanging a context-activity pair and associated recommendations.

FIG. 7A is a functional block diagram of the wireless device 100, the server 140 and the webserver 160 and their interaction when exchanging a metadata vector 138 and privacy control data 150* and when exchanging a context-activity pair 190 and associated recommendations 200. FIG. 7A will be discussed in greater detail below in conjunction with the network process flow diagram of FIG. 8 which shows the interaction of the wireless device 100 with the network server 140 and the web server 160 when carrying out the determination of the current context of the wireless device 100.

Turning now to FIG. 8A, a network process flow diagram is shown of the interaction of the wireless device 100 and the network server 140 when the user's wireless device sends a current context-activity pair to the network server 140 and the resultant service recommendations received back from the server 140. There are two ways that the user's device 100 can initiate sending the current context-activity pair to the server 140. The first way is shown in step 322 of FIG. 8A, where the user's device 100 is programmed to automatically obtain current context state 111 from a context inference engine 136, and to select an appropriate activity from the history log 110, and to send the current context-activity pair to the server 140. Another way that the device 100 can send a context-activity pair is shown in step 324, where the user inputs a selection of an activity onto the request a recommendation sub menu shown in FIG. 6E or 6F. In response, the device 100 then obtains the current context state 111 from the context inference engine 136. The device 100 then sends the current context-activity pair to the server 140.

Step 326 of FIG. 8A shows that the context-activity pair can be processed by the recommendation algorithms 112 in the wireless device 100, before transmission to the server 140. An important feature of the invention is that the information transmitted to the network server 140 is without any user identification, in order to preserve the privacy of the user's information. Often instead of single context-activity pair 190 a sample filtered by recommendation algorithm 112 of representative context-activity pairs and related service history items from log 110 is transmitted to recommendation algorithm 166. That is, message 190 is often a set of context-activity pairs and related service history items.

Figure 8:
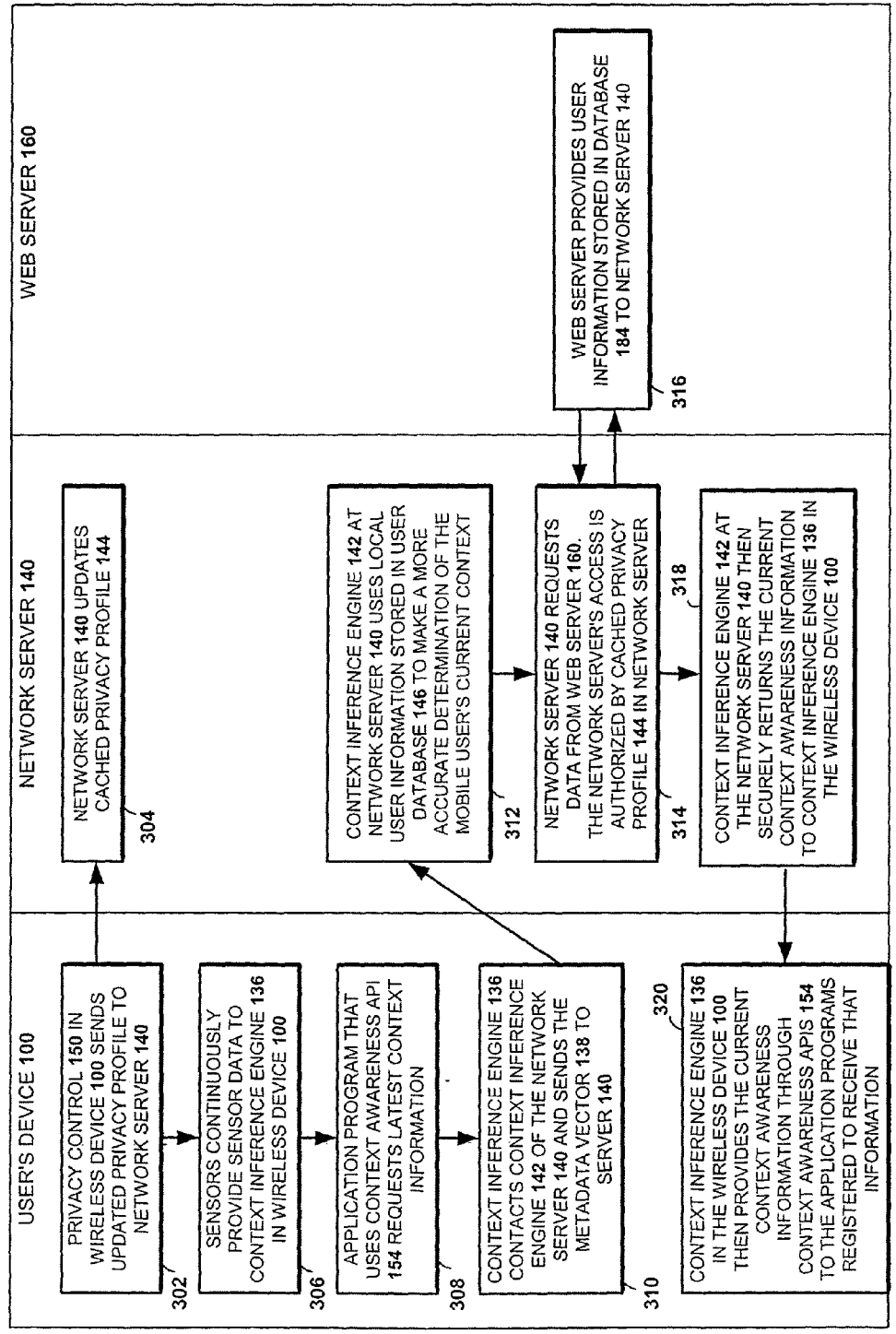
FIG. 8 is a network process flow diagram of the interaction of the wireless device, network server, and web server when carrying out the determination of the current context of the wireless device.
Figure 8D:
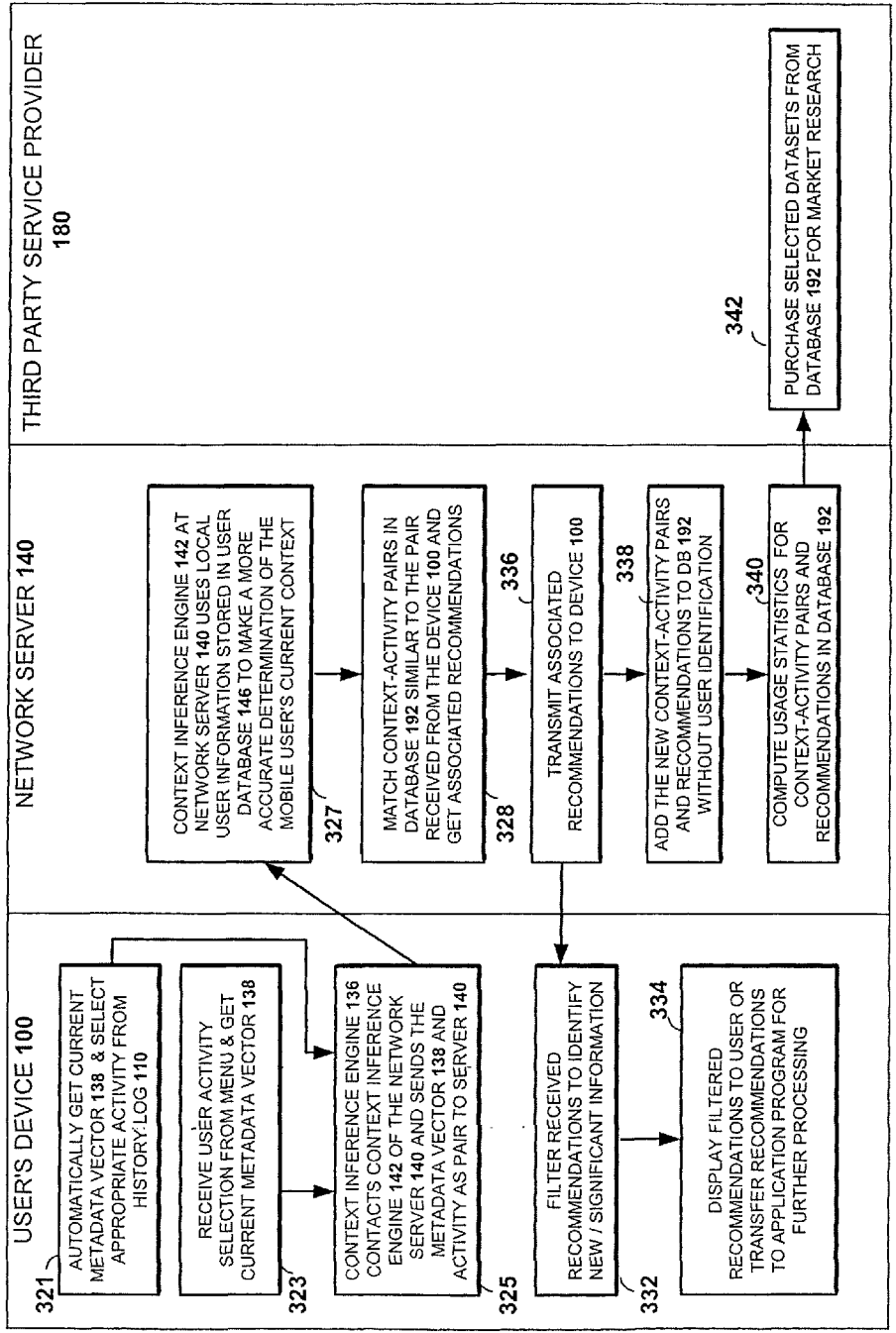
FIG. 8D is a network process flow diagram of an alternate embodiment of the invention, in which the context-activity pair information sent by the wireless device to the network server, includes a metadata vector. The network server can then assist the wireless device in determining the mobile device's current context, as well as the server sending the resultant service recommendations back to the wireless device.
Figure 8E:
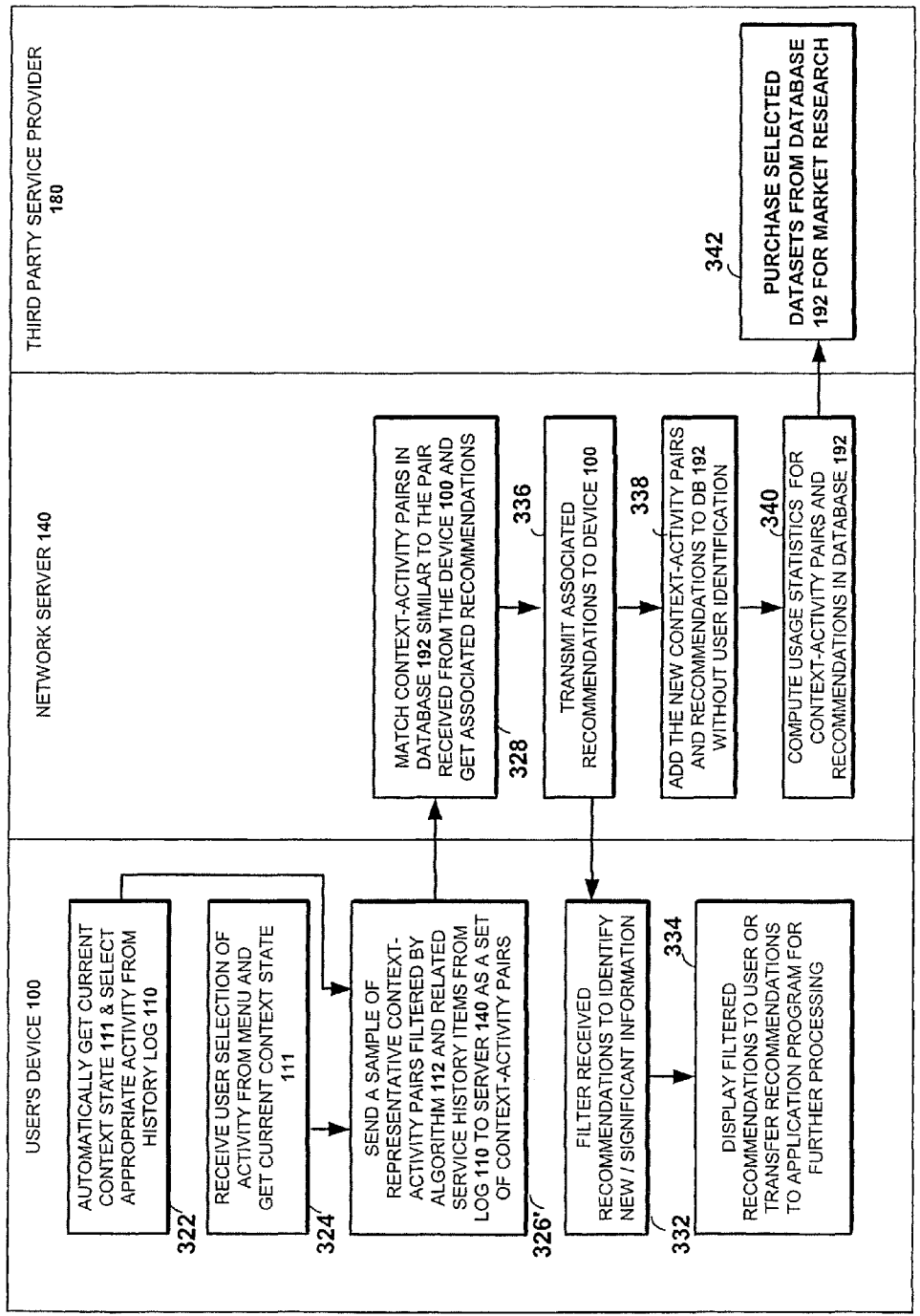
FIG. 8E is a network process flow diagram of an alternate embodiment of the invention, in which a recommendation algorithm in the server receives a sample of representative context-activity pairs filtered by algorithm and related service history items from log as a set of context-activity pairs and related service history items.

In an alternate embodiment of the invention shown in FIG. 8E, Step 326' sends to recommendation algorithm 166 in server 140, a sample of representative context-activity pairs filtered by algorithm 112 and related service history items from log 110 as a set of context-activity pairs and related service history items.

In step 328 of FIG. 8A, the network server 140 receives the context-activity pair 190 from the device 100, and processes the context-activity pair with the recommendation algorithms 166. The recommendation algorithms 166 match the context-activity pairs stored in the database 192 which are similar to the context-activity pair which was received from the device 100, and it accesses the associated recommendations for the matched context-activity pairs from the database 192. This can be seen to better advantage in FIG. 8B which shows the context-activity pairs and associated services database 192 in the server 140.

Referring for a moment to FIG. 6G, the user has selected at the wireless device 100, the activity of "dining—restaurant". The current context is a particular local time and location, a particular light level, ambient temperature, speed and acceleration. This current context information, values sent from the recommendation algorithms 111 in the device 100, and optionally the corresponding metadata vector 138, are sent as the context-activity pair information 190 to the network server 140.

Referring now to FIG. 8B showing an example of the contents of the database 192, the first row in the context-activity pairs column gives a range of times, a range of locations, a range of temperatures and a range of speed and accelerations for context-activity pairs which are to be matched with the current context-activity pair being transmitted from the wireless device 100. The corresponding associated service recommendations are shown in the middle column. For each respective service recommendation in the middle column, there is a corresponding number of times that that particular recommendation has been made to other users in the past, as shown in the right-hand column of FIG. 8B. The current context is 8:00 PM at night and therefore the service recommendations seem to be different from the service recommendations that would be made from the second row of the database 192 in FIG. 8B. In the second row it can be seen that the context-activity pairs deal with a morning timeframe at the same location. There, it can be seen that in the middle column for the second row, the recommendations are not the same as they were for the nighttime recommendations for the first row. Similar to the previous description, the right-hand column of FIG. 8B gives the number of times that each respective service recommendation has been made to prior users. The recommendation algorithms 166 in the network server 140 perform the matching operation and identify the first row in FIG. 8B as a match for context-activity pairs. Accordingly, the recommendation algorithms 166 in the network server 140 return the recommendations 200 to the user's wireless device 100. Those recommendations are the service recommendations shown in the upper row middle column of FIG. 8B. The number of times each recommendation has been made can also be transmitted in the recommendations 200. This is performed in the step 336 of the process diagram of FIG. 8A. The "number of times recommended" is only one of the measures which can be used to generate new recommendations. Other measures include parameters based on feedback.

Step 332 of FIG. 8A receives the recommendations 200 at the wireless device 100, and the recommendation algorithms 112 apply a filtering operation to the received recommendations to identify any new or significant information. New information can be determined by reference to the context-activity pairs and service history log 110 in device 100, which is shown in greater detail in FIG. 8C. There it can be seen that in the past, this particular wireless device 100 has received old recommendations for two entries which are also part of the set of recommendations 200 now being received from the server 140. The recommendation algorithm 112 removes the two old recommendations shown in the top row middle column of FIG. 8C so that only the new recommendations received in the recommendations 200 from the network server 140 are to be displayed to the user in the wireless device 100. The recommendations algorithms 112 can also make other determinations, for example it can examine the user's rating of the respective old recommendations as shown in FIG. 8C and can take the user's rating into consideration in the display of current recommendations to the user. The recommendation algorithms 112 in the wireless device 100 can also take into consideration the number of times that each respective recommendation has been previously recommended to other users, that information having been transmitted in recommendations 200 to the wireless device 100. Then in step 334 of FIG. 8A, the wireless device displays the filtered recommendations to the user. Alternately, the wireless device can transfer the filtered recommendations to an application program for further processing. In some embodiments the wireless device 100 provides feedback to the server 140 after step 334. The feedback is used to enhance the quality of later matching operations in step 328.

At the network server 140, as shown in FIG. 8A, step 336 transitions to step 338 in which the new context-activity pairs and recommendations are added to the database 192. An important feature of this invention is that there is no user identification which is included in the database 192. Then step 340 of FIG. 8A computes usage statistics for the context-activity pairs in the database 192 and associates the usage statistics with the respective recommendations stored in the database 192. This information can have economic value to third party service providers such as the service provider 180. As is seen in FIG. 8A, step 342 shows the third party service provider 180 purchasing selected data sets from the database 192 to be used for market research.

An alternate embodiment of the invention is shown in FIG. 8D. In the alternate embodiment, the context-activity pair information 190 sent by the wireless device 100 in FIG. 7A to the network server 140, includes the metadata vector 138. Where the processing power or memory capacity of the wireless device 100 may be limited, the network server 140 can make a more accurate determination of the mobile user's current context by assisting in the further processing of the metadata vector 138. The metadata vector 138, which is discussed in greater detail below, represents the current sensor signals and characterizes the current state of the wireless device 100. A context inference engine 142 in the network server 140 of FIG. 7A is embodied as programmed instructions executed within the server 140. The resultant current context computed by the server 140 and the activity information received from the wireless device 100 in the context-activity pair 190, constitute the current context-activity pair. The context-activity pair database 192 maintained by the server 140 associates a current context-activity pair with appropriate recommendations made in the past to many users. As the system makes new recommendations to users in response to context-activity pairs submitted by their wireless devices, the server 140 gathers the new recommendations and adds them to its context-activity pair database 192. No user personal data is included in the context-activity pair database 192. In this manner, the variety, quality and pertinence of the recommendations in the database 192 grows as the recommendation system is used. As an added benefit, the server 140 compiles statistical usage information about the recommendations and stores this in the context-activity pair database 192.

The network process flow diagram of the alternate embodiment of FIG. 8D begins with either step 321 or step 323 in the user's wireless device 100. In step 321, the user's device 100 is programmed to automatically obtain the current metadata vector 138 from the context inference engine 136, and to select an appropriate activity from the history log 110. In alternate step 323, the user can make an activity selection from the request a recommendation sub menu shown in FIG. 6E or 6F. Both steps 321 and 323 flow into step 325 in the user's wireless device 100. In step 325, the context inference engine 136 contacts the context inference engine 142 of the network server 140 shown in FIG. 7A, and sends the metadata vector 138 and activity as the context-activity pair 190 to server 140. The process then flows to step 327 in the network server 140. The context inference engine 142 at network server 140 uses user information stored in the server in the user database 146 to make a more accurate determination of the wireless device's current context. Step 327 then flows to step 328, and the rest of the steps in the flow diagram of FIG. 8D are substantially the same as those described above for FIG. 8A. In this manner, the network server 140 can then assist the wireless device 100 in determining the wireless device's current context, as well as the server 140 sending the resultant service recommendations back to the wireless device 100.

The context sensitive web services feature enables a mobile phone or wireless PDA to use context inference techniques to sense the user's environment and in response, to provide recommendations to the user that is appropriate to the user's perceived environment. The feature offloads some of the computationally intensive computing necessary in context inference techniques, from the mobile user's wireless device to a server and to web sites on the Internet. The context sensitive web services feature maintains a personal profile of the mobile user's personal preferences in an online server or web site. The mobile user is provided with the ability to control access by application programs in the wireless device, to the user's private data. The context sensitive web services feature provide the mobile user with the ability to control any access to the user's profile by the online server or web site.

The mobile user's wireless device is equipped with a context inference engine for providing and awareness of the mobile user's context to application programs, including third party applications. Since the processing power and storage capacity is limited in typical wireless devices, the computational load and storage requirements of the context inference engine are distributed to a context inference server capable of processing the context data. The feature enables the mobile user to control which application programs in the wireless device are granted access to the user's private context information. A privacy control block in the wireless device grants or revokes access by application programs to the private context information, based on the mobile user's preferences stored in a privacy profile. The same privacy control and privacy profile is extended to the context inference server, thereby enabling the extension of the user's privacy control to any web server connected to the context inference server. The feature thus enables building an infrastructure for context sensitive applications and services within the wireless device and the server, while providing to the mobile user control over the privacy user's context information.

The Recommendation Web Services menu displayed by the microbrowser 102 in FIG. 5 is rendered by the WAP client program 108 under the control of the application programs 106, which are shown in FIGS. 5 and 6. If the UPDATE PRIVACY FEATURES session type is selected by the user, the Recommendation Web Services menu of FIG. 5 then presents to the user the UPDATE PRIVACY FEATURES sub-menu from which the user can select the following options:

[A] UPDATE PRIVACY FEATURES:
        [1] UPDATE YOUR PRIVACY PROFILE
        [2] UPDATE YOUR PERSONAL DATA
        [3] AUTHENTICATE A PROGRAM

Option [1] of UPDATE YOUR PRIVACY PROFILE, leads to a second sub-menu shown in FIG. 6A, which has the following options:

[1] UPDATE YOUR PRIVACY PROFILE
        [a] Add a local program to permissions list
        [b] Remove a local program from list
        [c] Add a server program to permissions list
        [d] Remove a server program from list
        [e] Add a network program to permissions list
        [f] Remove a network program from list.

Option [2] of UPDATE YOUR PERSONAL DATA, leads to a another sub-menu shown in FIG. 6A, which has the following options:

[2] UPDATE YOUR PERSONAL DATA
        [a] Update server database
        [b] Update network database.

Option [3] of AUTHENTICATE A PROGRAM, leads to a another sub-menu shown in FIG. 6B, which has the following options:

[3] AUTHENTICATE A PROGRAM
        [a] Request program's public key certificate
        [b] Verify certificate signatures
        [c] Verify validity time
        [d] Verify revocation status
        [e] Check if certificate authority on trust list
        [f] Flag program as authenticated.

The AUTHENTICATE A PROGRAM option calls the privacy control 150 of the wireless device 100 in FIG. 7. If an application program A, B, X, or Y has been verified for its acceptability by a trusted authority, then the trusted authority will have issued a digital certificate on a message authentication code (MAC) it has computed for the application program, which can be checked by the privacy control 150. As long as the privacy control 150 trusts the trusted authority issuing the digital certificate, authentication of the application program is straight forward.

Once the mobile user has verified the program's digital certificate and is satisfied that the application program will not subvert the integrity or security of the user's private data, the user can register the program. Registration is the granting by the user of access permission to the program, to access the current context of the user's wireless device and/or to access other portions of the user's private data. There are several levels of permission that can be granted by the user in two categories, [a] when can the accesses take place and [b] what data can be accessed.

Option [4] of REGISTER A PROGRAM, leads to a another sub-menu shown in FIG. 6B, which has the following options:

[4] REGISTER A PROGRAM
   [a] When can the accesses take place
   [b] What data can be accessed, For the first category of [a] when can the accesses take place, the highest level of permission in this category is that access can occur anytime and without notice. The lowest level of permission in this category is that access can only occur at specified times or under specified conditions, and only after notice to the user and specific authorization by the user. For the second category of [b] what data can be accessed, the highest level of permission in this category is to access unlimited datasets in the user's private data, including current context information, personal data entered by the user, the user's Internet usage history data, the user's Internet cookie data, and the user's application program usage data. The lowest level of permission in this category is that access of any data can only occur after notice to the user and specific authorization by the user. The user can configure any levels of permission in between the highest and lowest and make that the basis for the registration. The user can include the terms of registration in a digital certificate signed by the user and appended to the application program. This registration certificate can be presented by the program to the privacy control 150 prior to a proposed access event, the privacy control 150 to automatically verify the registration status of the program. The registration certificate can be constructed as follows.

The privacy control 150 can compute a message authentication code (MAC) and its own digital signature and append it as a certificate to an acceptable application program A, B, X, or Y. The privacy control 150 can include the terms of registration in the digital certificate. Then when the program requests access to the user's private data, the privacy control 150 can automatically check the MAC and its own digital signature to verify that the program has not been changed and the privacy control 150 can also automatically verify the registration status of the program. This is achieved by the privacy control 150 computing a hash value for the entire application program A, B, X, or Y (or some portion of it) and the terms of registration, and then forming a message authentication code (MAC) from the hash value. The privacy control 150 then uses its PKI private key to digitally sign the message authentication code (MAC). The terms of the registration, the MAC and the privacy control's digital signature are appended to the application program A, B, X, or Y as a registration certificate.

Then, whenever the application program A, B, X, or Y requests access to the user's context data or private data, the privacy control 150 will require the application program to present the registration certificate so that the privacy control 150 can check that the presented MAC compares with a computed MAC and that the presented digital signature is genuine. The privacy control 150 can then automatically grant access permission to the application program, in accordance with the terms of the registration.

Methods to generate and evaluate message authentication codes to insure the integrity of data are described in the book by Stephen Thomas entitled "SSL and TLS", published by John Wiley and Sons, 2000. Two example algorithms for message authentication are RSA's Message Digest (MD5) and the Secure Hash Algorithm (SHA), both of which are described in the book by Stephen Thomas. Another reference that goes into greater detail in its discussion of data integrity methods is the book by Bruce Schneier entitled "Applied Cryptography—2nd Edition" published by John Wiley and Sons, 1996. Methods to generate and evaluate digital signatures to insure the source of the digital program are described in the book by Richard E. Smith entitled "Internet Cryptography", published by Addison Wesley, 1997.

What has been described here for the privacy control 150 in the wireless device 100, is equally applicable to the privacy control 164 in the network server 140 of FIG. 7A. The privacy control 164 in the network server 140 can compute the message authentication code (MAC) and its own digital signature and append it, with the terms of the registration, as a registration certificate to an acceptable application program in the web server 160. Privacy control 164 has a cached copy 144 of the Privacy Profile 152 of the wireless device 100. This enables automatically processing the privacy check in the network Server 140 for access requests from web server 160. When the application program in the web server 160 requests access to the user's private data in the network server 140 or in the wireless device 100, the privacy control 164 in the network server 140 will require the application program in the web server 160 to present the registration certificate so that it can check the MAC and its own digital signature to verify that the application program has not been changed. The privacy control 164 can then automatically grant access permission to the application program in the web server 160, in accordance with the terms of the registration.

FIG. 7 is a functional block diagram of the wireless device 100, showing its various components and programs. The wireless device 100 has context sensitive applications A, B, X, and Y, either downloaded, or in firmware. The wireless device 100 does not need to utilize external functionality in the network for the initial sampling and digitization of the sensor inputs. The sampled and digitized values of the sensor inputs are POSITIONING METADATA 122', TOUCH METADATA 124' AUDIO METADATA 125', COMPASS METADATA 126', AMBIENT LIGHT METADATA 128', AMBIENT TEMPERATURE METADATA 132', and THREE-AXIS ACCELERATION METADATA 134'. The sampled and digitized values of the sensor inputs are loaded into a metadata vector 138.

FIG. 7 shows the memory 202 of the wireless device 100, connected by the bus 204 to the keypad 104, the radio 206, the sensor interface 208, the central processor 210, and the display 212. The memory 202 stores programs which are sequences of executable instructions which, when executed by the processor 210, carry out the methods of the feature. The memory 202 stores the WAP client program 108, the context inference engine 136, the privacy control 150, the privacy profile 152, the context aware API 154, the motion/gesture API 156, the location API 158, and other APIs 162. The context inference engine 136 processes the metadata vector 138 to produce the current context. Application programs 106 stored in the memory 202 include the application programs A and B which are part of the software system SS1, and the application programs X and Y which are contained in the execution environment "Exec. Env."

If sufficient computational power and storage capacity are available in the wireless device 100, further processing of the metadata vector 138 can take place in the context inference engine 136, toward the objective of producing the result of an inferred current context. However, if at some point in the computation, the context inference engine 136 needs the processing power or storage capacity available at the network server 140, the metadata vector 138 is sent from the wireless device 100 to the context inference engine 142 in the network server 140 of FIG. 7A. The context inference engine 142 in the network server 140 an inferred current context can perform the required processing on the metadata vector 138 and then return it to the context inference engine 136 in the wireless device 100 for completion of the an inferred current context result. Alternately, the context inference engine 142 in the network server 140 can complete the required processing and then return the resultant inferred current context to the wireless device 100.

FIG. 7 shows the architecture of a wireless device with support for context awareness. The context awareness is built on top of sensory information received from various types of sensors physically located in the handset shown in FIG. 5. The sensors shown include POSITIONING SENSOR 122, TOUCH SENSOR 124, AUDIO SENSOR 125, COMPASS SENSOR 126, AMBIENT LIGHT SENSOR 128, AMBIENT TEMPERATURE SENSOR 132, and THREE-AXIS ACCELERATION SENSOR 134. The sensors can also be located in accessory-like phone covers or in a wireless accessory such as a Bluetooth enabled device. The sensors may also be located in the environment such as in the user's rooms or vehicles. Also the time duration of use of a phone and other available information can be used along with sensor data in context awareness services.

FIG. 7 shows sensor data received from the sensors 122, 124, 125, 126, 128, 132, and 134 is processed by Context Inference Engine 136 which then feeds the data through various APIs 154, 156, 158, and 162 to application programs A, B, X, and Y. The application programs may register themselves at the Application Programming Interface 154 to receive current context or changes in the context. This enables context sensitivity in the application programs.

FIG. 7 also shows "native" application programs A and B which are executed in a first software system SS1 of the wireless device 100. The term "Software System" is used here for any environment with execution capability. This first software system may be proprietary or based on a commercially available real-time operating system, such as NOS, ISA, EPOC, JAVA, or WAP. Third party application programs X and are executed within an execution environment. This execution environment may limit the system capabilities available for the application programs, such as access to APIs (fixed, not dynamic behavior). FIG. 7 further shows the mobile user's privacy control feature. The privacy control feature enables the user to designate which application programs are granted access to the context awareness APIs 154 to utilize the current context information produced by the context inference engine 136. All requests or registrations by application programs A, B, X, and Y to have access to the Context Inference Engine 136, must first go through the Privacy Control block 150. Privacy Control block 150 uses the user's security data check stored in the Privacy Profile 152 to grant access rights to the requesting application programs. The user controls the granting of access rights by means of the user's security data input by the user through the user interface. The user's security data includes permissions list 155, Public Key Infrastructure (PKI) certificates 157, PKI trusted authority trust list 159, and flags set by the user for those application programs that have been authenticated by the PKI procedures, data set 161. The user can update the user's security data with the UPDATE PRIVACY FEATURES menu displayed by the wireless device 100 shown in FIGS. 1A and 1B. Access might be granted to an application program based on its digital signature, which is a part of the system applications, or other means known in the art. It is also possible to provide a separate system-wide Privacy User Interface to the privacy control 150, which can be employed by the mobile user to set the privacy policies and to alert the mobile user that an application program is attempting to register to receive the user's private context awareness information. The privacy control 150 and Privacy Profile 152 enable the mobile user to grant, deny, or revoke access, to grant access for a limited time, or to require an application program to always request registration before the user grants access.

In FIG. 7, the Context Inference Engine 136 in the wireless device 100 makes inferences from all the sensor inputs based on where the wireless device is located by the mobile user. For instance the inferred current context of the device 100 may be "IN THE USER'S POCKET", when a certain set of sensors input a specific combination of signals having a specific value range. As an example, the resulting inference of the current context by the Context Interference Engine 136 could be expressed in XML language format as follows:

```
<Context Inference Engine in Device>
  <device placement> pocket </ device placement>
  <User Interface state> sleep mode </User Interface state>
  <device location> in elevator 5 building 1 floor 2</ device location>
  <API active actions> meeting starting on floor 3 room 322 </API active actions>
</Context Inference Engine in Device >
```

The Context Inference Engine 136 in the wireless device 100 can perform the context inference process with any of several methods. Different input information from the sensors can be weighted according to their relative value of importance appropriate for each environment condition or situation to be analyzed. Each sensor has its own weight value. Alternatively, the weight values for each sensor for each environment condition can be learned from training sessions using, for example artificial neural networks (ANNs), self-organizing maps (SOMs), decision trees, fuzzy rule-based systems, or model-based systems such as Hidden Markov Modeling (HMM). Combinations of two or more of the alternate methods can be used, depending on the application.

The Context Inference Engine 136 can continuously adapt its weights through adaptive and continuous learning methods, where the user teaches the wireless device 100 new environment conditions and names them. Hidden Markov Modeling (HMM) can be used, for example, to implement an adaptive and continuous learning method for the Context Inference Engine 136. Alternately, the wireless device 100 can be programmed to spontaneously recognize a changed scene by comparing it with known scenes. The user can teach the wireless device new environmental conditions and name them, using the adaptive and automatic learning capability of neural networks. Adaptive and continuous learning methods are computationally intensive and are appropriate candidates to place on the network server 140, which assists the wireless device 100, as discussed below.

The field of context inference has applied the principles of automated pattern recognition to processing diverse types sensor inputs. Speech recognition has been applied to processing speech signals and handwriting recognition has been applied to processing hand force and accelerometer signals. In the field of robotics, image recognition has been applied to processing digitized still and motion images, mechanical location recognition has been applied to processing laser and sonar range finder signals, and mechanical motion recognition has been applied to processing inertial, acceleration, and heading signals. In the field of prosthetic devices, touch recognition has been applied to processing tactile sensor signals. In the field of medicine, automated diagnostic programs recognize various pathologies by processing bioelectric field signals, as well as the more traditional pulse, respiration rate, and body temperature signals. These diverse sensor signal recognition processes have the common feature that an initial training stage is conducted where sampled signals are equated with a statistical model for those signals.

The principles of automated pattern recognition for these diverse sensor inputs are exemplified by the techniques for recognizing speech patterns. A common technique used in speech recognition is Hidden Markov Modeling (HMM). The term "Hidden" refers to the probabilistic and not directly observable events which underlie a speech signal. HMM speech recognition systems typically use realizations of phonemes which are statistical models of phonetic segments having parameters that are estimated from a set of training examples. Models of words are made by chaining or linking appropriate statistical models of phonetic segments. The statistical models serve as standards which are to be matched with the unknown voice signals to be recognized.

Recognition of unknown voice signals requires sampling and digitizing the speaker's spoken phonemes. These digitized phonemes are then processed into metadata. The metadata is then compared with the standard statistical models of phonemes. The most likely matches are then the inferred speech recognition result.

Recognition consists of finding the most likely path through the set of word models for the input speech signal. HMM speech recognition decoding systems first need to be trained through an iterative process. The system must be exposed to training examples or words of a particular speaker's voice. A training word is analyzed to generate a framed sequence of acoustic parameters or statistical models. A valid or "good" recognition occurs when the most likely path through the set of word models for the training word results in recognizing the correct training word.

Some useful references discussing the principles of Hidden Markov Models are: Rabiner, L. R., "A tutorial on hidden Markov models and selected applications in speech recognition", Proceedings of the IEEE, volume 77, number 2, 1989, pages 257-286, Rabiner, L. R. and Juang, B. H., "An introduction to hidden Markov models", IEEE ASSP Magazine, January 1986, pages 4-15. Fraser, Andrew M. and Dimitriadis, Alexis, "Forecasting Probability Densities by Using Hidden Markov Models with Mixed States", Time Series Prediction: Forecasting the Future and Understanding the Past, Addison-Wesley, editor Weigend, Andreas S. and Gershenfeld, Neil A., 1994. Charniak, Eugene, Statistical Language Learning, MIT Press, Cambridge, Mass., 1993.

To illustrate how Hidden Markov Modeling (HMM) can be extended beyond speech recognition, an example is given here for touch recognition. In the training stage for touch recognition, tactile sensor signals are input from touching a tactile transducer to a rough texture, such as for example sandpaper. The tactile sensor signals are transformed into a statistical model of the input signal. The statistical model is stored as a standard in a computer memory under the handle "rough_texture". To expand the range of sensor signals that are included in the model for "rough_texture", several training sessions can be conducted, each with a different direction or pressure for touching the sandpaper, resulting in several different samples of the statistical model. The set of samples of the statistical model are stored as a standard under the handle "rough_texture". Other training sessions are conducted with a smooth texture, such as glass. The tactile sensor signals input from touching the tactile transducer to the smooth texture are transformed into a statistical model of the input signal and stored as a standard under the handle "smooth_texture". Later, in the recognition mode, an unknown object is touched by the tactile transducer resulting in a sample tactile sensor signal. Recognition of unknown touch signals requires sampling and digitizing the touch transducer's signals. These digitized sensor signals are then processed into metadata. The metadata is then compared with the standard statistical models of "rough_texture" and "smooth_texture". The most likely match is then the inferred touch recognition result.

Combinations of two or more types of sensors can have their signals combined into an input metadata vector that characterizes a composite sampling event. The composite sampling event can be recognized using the principles of Hidden Markov Modeling (HMM). An example composite sampling event can be the state of the health and fatigue of the user of a wireless device 100. For example, a wireless device 100 can be equipped with a tactile transducer which outputs tactile sensor signals in response to the hand force and pulse rate of the user who is gripping the wireless device 100. The wireless device 100 can be equipped with a temperature sensor which outputs body temperature signals in response to the user gripping the wireless device 100. Hidden Markov Modeling (HMM) can be used to recognize a force/temperature input metadata vector that characterizes the combination of the hand force and the temperature sensor signals resulting from a sampling event. A composite sampling event in this example can have an extended duration so that the force sensor can transduce the pulse rate of the user over a period of time.

In the training stage, the tactile sensor signals and the force sensor signals are output while the user is in a condition of good health and resting normally. The tactile sensor signals and the force sensor signals are combined into a force/temperature input metadata vector which is transformed into a statistical model of the input signals. The statistical model is stored as a standard in the computer memory of the wireless device 100 under the handle "good_health_resting_normally". Other training sessions are conducted with the user in different states of health and fatigue. For example, the user may be training the wireless device 100 while working late at night at the office. The tactile sensor signals and the force sensor signals resulting from holding the wireless device 100, are combined into a force/temperature input metadata vector for the user in the condition of being in good health but fatigued. The force/temperature input metadata vector is transformed into a statistical model of the input signals and stored as a standard under the handle "good_health_fatigued".

Later, in the recognition mode, as the user holds the wireless device 100, the tactile sensor signals and the force sensor signals are sampled. The Health/Fatigue_State recognition consists of sampling and digitizing the touch transducer's signals. These digitized sensor signals are then processed into a metadata vector. The metadata vector is then compared with the standard statistical models of handle "good_health_resting_normally" and "good_health_fatigued". The most likely match is then the inferred touch recognition result.

In accordance with the feature, this recognition result can be used by a health maintenance application program in the wireless device 100, to provide useful and appropriate information to the user. For example, a health maintenance program can process the recognition result, and in response, signal an alarm to the user and provide suggestions for medications to palliate the sensed fatigue. One problem with automatic recognition programs is that they are either relatively large or they call databases that are relatively large in comparison to the memory capacity of the wireless device 100.

Another aspect of the feature is the recognition result can be used by a supplementary application program in a remote server, to provide additional and more detailed useful and appropriate information to the user. For example, the server can access a large database of suggestions for medications to palliate the sensed fatigue of the user. The results of the search of the database can be returned to the wireless device 100. The server can also maintain a personal profile of the user's characteristics and preferences and it can use that profile in automatically formulate its query to the database. For example, the user's drug allergies can be stored in the server's database, to insure that recommendations are not made that will result in an allergic reaction by the user to the suggested medication.

FIG. 7A is a functional block diagram of the wireless device 100, the server 140, and the web server 160, and their interaction when exchanging the metadata vector 138 and the privacy control data 150'. These exchanges are bulk encrypted with a symmetric session key, such as a Data Encryption Standard (DES) key, to protect the privacy of the data. To insure the integrity of the metadata vector 138 and the privacy control data 150', a message authentication code (MAC) can be computed and appended to the data, as described in the above referenced book by Stephen Thomas entitled "SSL and TLS", published by John Wiley and Sons, 2000. To insure that the source of the metadata vector 138 and the privacy control data 150' cannot be repudiated, a digital signature can be appended to the data, as described in the above referenced book by Richard E. Smith entitled "Internet Cryptography", published by Addison Wesley, 1997.

FIG. 7A shows the scope of the distributed context awareness implementation. The wireless device 100 has context sensitive applications A, B, X, and Y either downloaded or in firmware. The wireless device 100 may locally preprocess part of the context information in the metadata vector 138 before sending it to the context inference engine 142 in the network server 140 which is capable of processing the data and responding back with the resulting current context. The wireless device 100 may run application programs that require accessing the web service server 160 to provide context sensitive services to the mobile user.

FIG. 7A shows how processing of sensor data from the sensors in the wireless device 100, can be distributed between the wireless device and the network server 140. The operation in FIG. 7A is as follows:

1. The sensors continuously provide the sensor data to the Context Inference Engine 136 in the wireless device 100.
2. An application program that utilizes the context awareness APIs 154 may request the latest context information, or the application program may be registered to receive any changes to specific context information.
3. The Context Inference Engine 136 securely contacts the Context Inference Engine 142 of the network server 140 and sends the metadata vector 138 to the server 140. Depending on the sensors and the implementation details, Context Inference Engine 136 may preprocess part of the sensor data in the metadata vector 138 prior to sending it. Depending on the sensors and the interval for processing, there may be virtual connection open between Context Inference Engine 136 and Context Inference Engine 142 for frequent data exchanges. Context Inference Engine 142 at the network server 140, has the processing power and memory capacity to handle computationally intensive and/or memory intensive processing of the preprocessed sensor data in the metadata vector 138 to produce the current context result information.
4. Context Inference Engine 142 at the network server 140 may utilize local user information (history information, customer details) stored in the user database 146 for making a more accurate determination of the mobile user's current context.
5. Context Inference Engine 142 at the network server 140 then securely returns the current context awareness information to Context Inference Engine 136 in the wireless device 100.
6. Context Inference Engine 136 in the wireless device 100 then provides the current context awareness information through Context Awareness APIs 154 to the application programs registered for to receive that information.

FIG. 7A shows how Web Services in Web Service Server 160 are enabled to receive current context results of the wireless device 100. Web Services Server 160 has a software system for server application program A and an execution environment for server application programs X and Y that are similar to the software system SS1 and execution environment (Exec. Env.) in the wireless device 100 shown in FIG. 7. Server Application programs A, X, and Y in Web Service Server 160 may require access through the Context Awareness APIs 178 to provide Web Services with the current context of the wireless device 100.

In FIG. 7A, Web Service Server 160 uses the Context Inference Client 176 to contact the Context Inference Server 174 in the network server 140. Context Inference Client 176 may utilize customer database information in database 184 to enhance the context sensitivity capabilities of the web server 160. The contact to the network server 140 is done through a context awareness interface 186 to the Context Inference Server 174 in the network server 140.

Context Inference Server 174 registers the Web Services of the web server 160 through the privacy control 164 of the network server 140 to the Context Inference Engine 142. Privacy control 164 has a cached copy 144 of the Privacy Profile 152 of the wireless device 100. This enables processing of the privacy check in the network Server 140 for access requests from web server 160. The communication between web server 160 and network server 140 is secured using the Internet secure protocols such as HTTPS or SSL. The Context Inference Server 174 can publish its own service as a Web Service to other Web Services on the Internet, in which case the implementation of the interface 186 between web server 160 and network server 140 can be Extensible Markup Language (XML) messages carried in the Simple Object Access Protocol (SOAP) messaging protocol.

The Context inference Engine 142 in the network server 140 will receive processed sensor metadata vector 138 information and possibly some application API information originated from the Context Inference Engine 136 of the wireless device 100. The Context inference Engine 142 of the network server has user database 146 information of the behavior of the user and of the past usage of the wireless device. The Context inference Engine 142 of the network server may also have third party services available (such as instances offering content and/or services) to be offered to potential users. What is offered to the user can also depend on the user profile 144. The nature of the Context inference Engine 136 information of the wireless device 100 that is conveyed to the Context inference Engine 142 of the network can be controlled with the privacy control 150 that is managed by the user of the wireless device 100. The user may thus fully or partly disable the Context inference Engine 142 of the network to control the amount of his/her information that can be used by third party services. The privacy control 150 enables the user to control access by anyone to his/her private information.

The Context inference Engine 136 of the wireless device receives an input from the API interface 154 from the applications A, B, X, or Y located in the wireless device 100. An example would be from a calendar application program indicating that a meeting is starting in 25 minutes time. As another example the calendar application program indicates that Lisa is having a birthday tomorrow into which you are participating. The Context inference Engine 136 of the wireless device can convey processed result information to the Context inference Engine 142 of the network server. Now in addition to the sensor information, information from the application programs A, B, X, or Y can also be used in the decision making of the Context inference Engine 136 of the wireless device. A combination of the sensor information and information coming from the application programs A, B, X, or Y can be processed by the Context inference Engine 136. The user's behavior or usage patterns can be detected from the sensor and recorded in a the user database, concerning the usage of the application programs. As previously discussed, the processing of this combined information from the sensors and from the application programs can be shared between the Context inference Engine 136 and the Context inference Engine 142.

The information transfer from the Context inference Engine 136 of the wireless device to the Context inference Engine 142 of the network server can be done in alternative ways. The system can be managed so that the current consumption and transfer capacity between the wireless device 100 and the network server 140 is taken into account. The context information does not always have to be collected so frequently that it would have to be periodically transferred to the network side 140 every few seconds. Depending on the application, the timing window applied to information transfer from the Context inference Engine 136 of the wireless device 100 to the Context inference Engine 142 of the server 140 can vary from seconds to minutes. If there were no event change or condition change in the environment of the wireless device 100, there would be no need to transfer information to the Context inference Engine 142 of the server 140. Additionally information can be temporarily stored in a buffer in the wireless device 100, which can then transferred less frequently to the network Context inference Engine 142. Packet based GPRS and UMTS can support the less frequent information transfer rates. Also, it is advantageous to send the network Context inference Engine 142 information from the wireless device 100 as an attachment, immediately subsequent to other signaling made to in the network direction from the wireless device 100, thus saving the radio transmitter of the wireless device 100 from having to be switched on again for transferring the Context inference Engine 136 information separately to the network server 140.

Returning to FIG. 5, the relationship is shown between the network server 140, the Universal Description, Discovery and Integration (UDDI) registry 170, and a plurality of web site servers 160. UDDI is a de facto standard for an Internet-based registry. The UDDI registry 170 enables the network server 140 to discover new web sites for services and businesses on the Internet. Once such services and businesses are identified by the UDDI registry 170 to the network server 140, then the server 140 must apply the mobile user's cached privacy profile 144 in FIG. 7A, in order to prevent unauthorized access of the user's private data by application programs on the newly discovered web sites.

FIG. 8 is a network process flow diagram of the interaction of the wireless device 100. In the first column, network server 140 in the middle column, and web server 160 in the right column, when they carry out the determination of the current context of the wireless device 100. The process begins with the wireless device 100 in step 302:

Step 302: PRIVACY CONTROL 150 IN WIRELESS DEVICE 100 SENDS UPDATED PRIVACY PROFILE TO NETWORK SERVER 140.

Then the network server 140 continues with step 304:

Step 304: NETWORK SERVER 140 UPDATES CACHED PRIVACY PROFILE 144.

The wireless device 100 continues with the following steps 306, 308, and 310:

Step 306: SENSORS CONTINUOUSLY PROVIDE SENSOR DATA TO CONTEXT INFERENCE ENGINE 136 IN WIRELESS DEVICE 100.

Step 308: APPLICATION PROGRAM THAT USES CONTEXT AWARENESS API 154 REQUESTS LATEST CONTEXT INFORMATION.

Step 310: CONTEXT INFERENCE ENGINE 136 CONTACTS CONTEXT INFERENCE ENGINE 142 OF THE NETWORK SERVER 140 AND SENDS THE METADATA VECTOR 138 TO SERVER 140.

Then the network server 140 continues with steps 312 and 314:

Step 312: CONTEXT INFERENCE ENGINE 142 AT NETWORK SERVER 140 USES LOCAL USER INFORMA- TION STORED IN USER DATABASE 146 TO MAKE A MORE ACCURATE DETERMINATION OF THE MOBILE USER'S CURRENT CONTEXT.

Step 314: NETWORK SERVER 140 REQUESTS DATA FROM WEB SERVER 160. THE NETWORK SERVER'S ACCESS IS AUTHORIZED BY CACHED PRIVACY PROFILE 144 IN NETWORK SERVER.

Then the web server 160 continues with step 316:

Step 316: WEB SERVER PROVIDES USER INFORMATION STORED IN DATABASE 184 TO NETWORK SERVER 140.

Then the network server 140 continues with step 318:

Step 318: CONTEXT INFERENCE ENGINE 142 AT THE NETWORK SERVER 140 THEN SECURELY RETURNS THE CURRENT CONTEXT AWARENESS INFORMATION TO CONTEXT INFERENCE ENGINE 136 IN THE WIRELESS DEVICE 100.

Then the wireless device 100 finishes with step 320:

Step 318: CONTEXT INFERENCE ENGINE 136 IN THE WIRELESS DEVICE 100 THEN PROVIDES THE CURRENT CONTEXT AWARENESS INFORMATION THROUGH CONTEXT AWARENESS APIs 154 TO THE APPLICATION PROGRAMS REGISTERED TO RECEIVE THAT INFORMATION.

Figure 9:
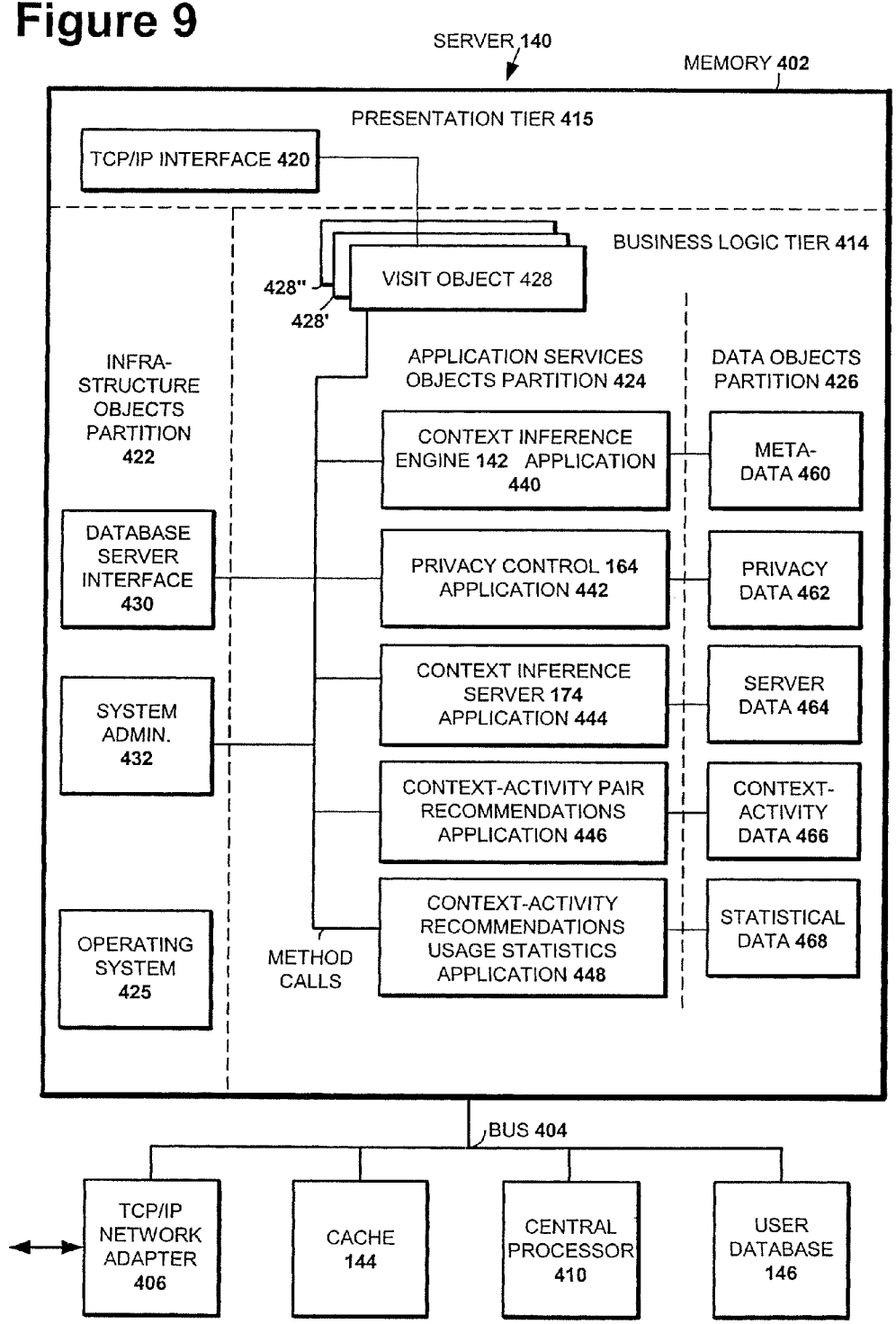
FIG. 9 is a functional block diagram of the network server 140, showing the memory storing the application services software programs needed to perform the operations of the invention.

FIG. 9 is a functional block diagram of the network server 140, showing a memory 402 storing the application services software programs needed to perform the operations of an embodiment of the feature. The memory is connected by a bus 404 to a cache 144, user database 146, TCP/IP network adapter 406, and a central processor 410. The memory 402 stores programs which are sequences of executable instructions which, when executed by a processor 410, carry out the methods of the feature.

FIG. 9 discloses the functional components of an exemplary network server 140 arranged as an object model. The object model groups the object oriented software programs into components that perform the major functions and applications in network server 140. The object model for memory 402 of network server 140 employs a three-tier architecture that includes presentation tier 415, infrastructure objects partition 422, and business logic tier 414. The object model further divides business logic tier 414 into two partitions, application objects partition 422 and data objects partition 426.

Presentation tier 415 retains programs that manage the device interfaces to network server 140. In FIG. 9, presentation tier 415 includes network interface 420. A suitable implementation of presentation tier 415 may use Java servlets to interact with WAP protocol gateway 120 via hypertext transfer protocol ("HTTP"). The Java servlets ran within a request/response server that manages the exchange of messages between WAP protocol gateway 120 and network server 140. A Java servlet is a Java program that runs within a Web server environment. A Java servlet takes a request as input, parses the data, performs logic operations, and issues a response back to WAP protocol gateway 120. The Java runtime platform pools the Java servlets to simultaneously service many requests. Network interface 420 accepts request messages from WAP protocol gateway 120 and passes the information in the request to visit object 428 for further processing. Visit object 428 passes the result of that processing to network interface 420 for transmission back to the WAP protocol gateway 120. Network interface 420 may also use network adapter 406 to exchange data with another user device.

Infrastructure objects partition 422 retains the programs that perform administrative and system functions on behalf of business logic tier 414. Infrastructure objects partition 422 includes operating system 425, and an object oriented software program component for database server interface 430, and system administrator interface 432.

Business logic tier 414 in FIG. 9 includes multiple instances of visit object 428, 428', 428". A separate instance of visit object 428 exists for each network interface 420 session. Each visit object 428 is a stateful session object that includes a persistent storage area from initiation through termination of the session, not just during a single interaction or method call. The persistent storage area retains information associated with the session.

When WAP protocol gateway 120 sends a metadata vector 138 message to network server 140, the message is sent to network interface 420 to invoke a method that creates visit object 428 and stores connection information as a state in visit object 428. Visit object 428 may, in turn, invoke a method in context inference engine 142 application 440 to perform a context inference on the metadata vector and return a current context result.

When WAP protocol gateway 120 sends a privacy control data 150' message to network server 140, the message is sent to network interface 420 to invoke a method that creates visit object 428 and stores connection information as a state in visit object 428. Visit object 428 may, in turn, invoke a method in privacy control 164 application 442 to update the cached privacy profile 144.

When WAP protocol gateway 120 sends a context-activity pair message 190 to network server 140, the message is sent to network interface 420 to invoke a method that creates visit object 428 and stores connection information as a state in visit object 428. Visit object 428 may, in turn, invoke a method in context-activity pair recommendations application 446. Application 446 may, in turn make a method call to context-activity recommendations usage statistics application 448.

Figure 10:
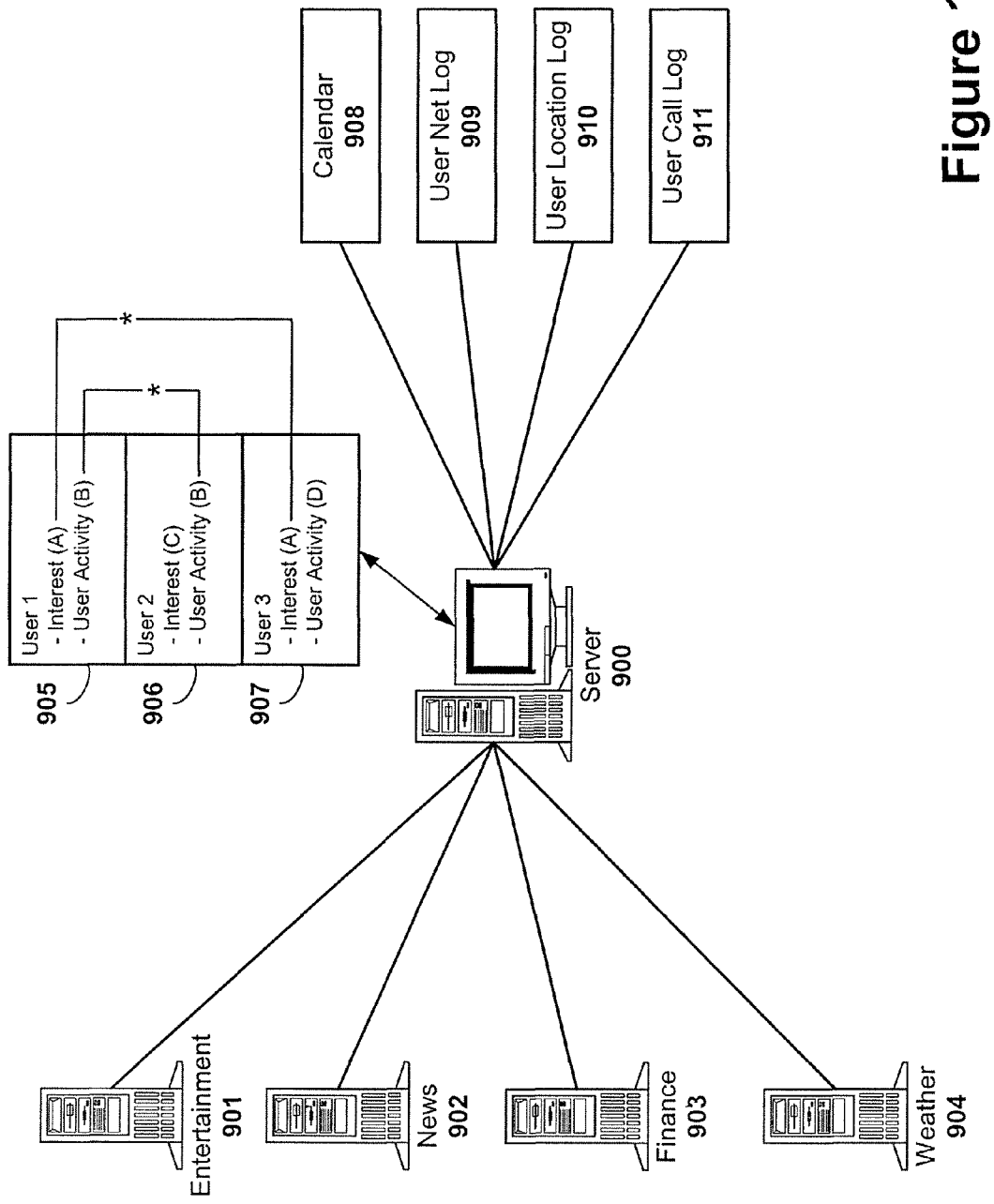
FIG. 10 is a diagram of a server that distributes services to communications network users.

FIG. 10 discloses a further embodiment of the invention, wherein a server 900 distributes services to communications network users 905, 906, and 907. The server 900 collects various user information regarding user's interests/profiles and device activities. This user information may be provided from the user or from each user's history log 149 in FIG. 6, and is communicated to the network 900. The server 900 can provide its own content or may interface with outside sources (for example "Entertainment" 901, "News" 902, "Finance" 903 and/or "Weather" 904) to provide the content for the users. The users can influence the received content through the modification of their interests/profiles and in their respective history logs 149. Alternately, users can upload their device activity to through a user net log 909, user location log 910 or user call log 911, where the users may modify or customize the user information and then forward their device activities to the server 900. Various combinations may be used as well, such as collecting user calls (via user call log 911) made at a particular time (via calendar 908) from particular NIV locations (via user location log 910). Additional calendar services 908 may also be incorporated into the system, such as the type described in U.S. patent application Ser. No. 09/397,003, filed Sep. 14, 2000, and U.S. Pat. No. 5,790,974 which are incorporated by reference herein.

The server 900 of FIG. 10 can thus dynamically change the content transmitted to the users on the basis of each user's device location and activity. Various clubs or associations can be formed through the system based on similar interests/profiles or activities of the users. As users are formed into "communities", tailored content can then be sent to the user's devices. Information from the server 900 may also be incorporated in a Web-Based portal, where users can access their device profiles and make further modifications as each user sees fit.

A description of server programming applications developed with Enterprise Java Beans is provided in the book by Ed Roman entitled "Mastering Enterprise Java Beans", published by John Wiley and Sons, 1999. A description of the use of an object model in the design of server applications is provided in the book by Matthew Reynolds entitled "Beginning E-Commerce", Wrox Press Inc, 2000, (ISBN: 1861003986). Java servlets and the development of web site servers is described in the book by Duane K. Fields, et al. entitled "Web Development with Java Server Pages", published by Manning Publications Co., 2000.

The resulting invention provides a distributed recommendation system having greater privacy for the user's private data. The invention distributes the tasks of a recommendation system between wireless devices and network servers, so as to protect the privacy of end users. The invention provides greater privacy for context-sensitive, adaptive, user interfaces for Internet service usage by wireless devices.

In addition to the embodiments described above, the NIV/recommendation/context features may be combined in various ways to produce a desired result. While the disclosure above was based in a WAP environment, the principles of the present invention are equally applicable to other technologies such as LANs or Bluetooth™ devices. Furthermore, the application of the recommendation services are great and can include features as e-commerce programs, headline news, money exchange rate programs, sports results, stock quotes, weather forecasts, multilingual phrase dictionary programs, personal online calendar programs, travel programs, banking services, bill paying services/virtual wallet etc. Also, the type of data that is sent to the user's device is not limited to text files only. Ring tones, text, photographic/image content, video/multimedia content and other types or combinations of types may be transmitted under the present invention.

Although illustrative embodiments have been described herein in detail, it should be noted and understood that the descriptions and drawings have been provided for purposes of illustration only and that other variations both in form and detail can be made thereupon without departing from the spirit and scope of the invention. The terms and expressions have been used as terms of description and not terms of limitation. There is no limitation to use the terms or expressions to exclude any equivalents of features shown and described or portions thereof.

What is claimed is:

1. A method for determining one or more resource recommendations utilizing novelty index values, the method comprising:
   receiving, utilizing at least one interface, history location information including a plurality of history locations associated with a wireless device;
   assigning, utilizing at least one processor, one or more novelty index values associated with the wireless device for at least one location within the received history location information,
      wherein the assigned novelty index value provides a measure of novelty for the wireless device occupying an associated location;
   determining context information with respect to the wireless device, wherein the context information comprises current location information and the one or more assigned novelty index value associated with the current location information for the wireless device;
   configuring at least one application, based at least in part on the determined context information, by customizing one or more augmentations of the at least one application, based at least in part on a plurality of the assigned novelty index value associated with the current location information and the history location information; and
   determining one or more resource recommendations associated with the customizing of the one or more augmentations of the at least one application.

2. A method as in claim 1,
   wherein the novelty index value is assigned by accessing a database for information associated with the novelty index value,
   wherein the improvement comprises determining the one or more resource recommendations directed toward developing a current personalization, associated with a user of the wireless device, based at least in part on the plurality of assigned novelty index values,
   wherein the determining one or more resource recommendations is based at least in part a current context-activity pair comprising the context information with respect to the wireless device and a requested activity,
   wherein the determining one or more resource recommendations comprises adapting the one or more resource recommendations based at least in part on the context information.

3. A method as in claim 1, wherein the determining one or more resource recommendations is further based at least in part on a comparison between a current context-activity pair and one or more historical context-activity pairs stored in a database.

4. A method as in claim 1, wherein the location information comprises information about travel routes, and the context information further comprises information regarding one or more of ambient sounds, ambient light, ambient temperature, orientation, speed, direction, ambient pressure, and ambient humidity, that is gathered by the wireless device.

5. A method as in claim 1, wherein the one or more resource recommendations are filtered based at least in part on a determination that at least one of the one or more resource recommendations matches a prior resource recommendation associated with the current context-activity pair.

6. A method as in claim 1, wherein the one or more resource recommendations are further based at least in part on one or more of user ratings with respect to the one or more resource recommendations or a number of times that each of the one or more resource recommendations has been provided to other users.

7. A method as in claim 1, wherein the customizing one or more augmentations of the at least one application comprises determining content for transmission to the wireless device, wherein the content is based at least in part on user information regarding one or more of user interest profiles and wireless device activities.

8. A method as in claim 7, wherein the user information is obtained from a user history log.

9. A method as in claim 7, wherein the content is dynamically updated based at least in part on the context information.

10. An apparatus for determining one or more resource recommendations utilizing novelty index values, the apparatus comprising:

at least one processor; and at least one memory including computer program code for one or more programs, the at least one memory and the computer program code configured to, with the at least one processor, cause the apparatus to perform at least the following, receive, utilizing at least one interface, history location information including a plurality of history locations associated with a wireless device, assign, utilizing the at least one processor, one or more novelty index values associated with the wireless device for at least one location within the received history location information, wherein the assigned novelty index value provides a measure of novelty for the wireless device occupying an associated location, determine context information with respect to the wireless device, wherein the context information comprises current location information and the one or more assigned novelty index value associated with the current location information for the wireless device, configure at least one application, based at least in part on the determined context information by customizing one or more augmentations of the at least one application, based at least in part on a plurality of the assigned novelty index value associated with the current location information and the history location information; and determining one or more resource recommendations associated with the customizing of the one or more augmentations of the at least one application.

11. An apparatus as in claim 10, wherein the novelty index value is assigned by accessing a database for information associated with the novelty index value, wherein the improvement comprises determining the one or more resource recommendations directed toward developing a current personalization, associated with a user of the wireless device, based at least in part on the plurality of assigned novelty index values, wherein the determining one or more resource recommendations is based at least in part a current context-activity pair comprising the context information with respect to the wireless device and a requested activity, wherein the determining one or more resource recommendations comprises adapting the one or more resource recommendations based at least in part on the context information.

12. An apparatus as in claim 10, wherein the determining one or more resource recommendations is further based at least in part on a comparison between a current context-activity pair and one or more historical context-activity pairs stored in a database.

13. An apparatus as in claim 10, wherein the location information comprises information about travel routes, and the context information further comprises information regarding one or more of ambient sounds, ambient light, ambient temperature, orientation, speed, direction, ambient pressure, and ambient humidity, that is gathered by the wireless device.

14. An apparatus as in claim 10, wherein the one or more resource recommendations are filtered based at least in part on a determination that at least one of the one or more resource recommendations matches a prior resource recommendation associated with the current context-activity pair.

15. An apparatus as in claim 10, wherein the one or more resource recommendations are further based at least in part on one or more of user ratings with respect to the one or more resource recommendations or a number of times that each of the one or more resource recommendations has been provided to other users.

16. An apparatus as in claim 10, wherein the customizing one or more augmentations of the at least one application comprises determining content for transmission to the wireless device, wherein the content is based at least in part on user information regarding one or more of user interest profiles and wireless device activities.

17. An apparatus as in claim 16, wherein the user information is obtained from a user history log.

18. An apparatus as in claim 16, wherein the content is dynamically updated based at least in part on the context information.

19. A non-transitory computer-readable storage medium for determining one or more resource recommendations utilizing novelty index values, the medium carrying one or more sequences of one or more instructions which, when executed by one or more processors, cause an apparatus to at least perform the following steps:

receiving, utilizing at least one interface, history location information including a plurality of history locations associated with a wireless device;

assigning, utilizing at least one processor, one or more novelty index values associated with the wireless device for at least one location within the received history location information, wherein the assigned novelty index value provides a measure of novelty for the wireless device occupying an associated location;

determining context information with respect to the wireless device, wherein the context information comprises current location information and the one or more assigned novelty index value associated with the current location information for the wireless device;

configuring at least one application, based at least in part on the determined context information by customizing one or more augmentations of the at least one application, based at least in part on a plurality of the assigned novelty index value associated with the current location information and the history location information; and determining one or more resource recommendations associated with the customizing of the one or more augmentations of the at least one application.

20. A non-transitory computer-readable storage medium as in claim 19, wherein the novelty index value is assigned by accessing a database for information associated with the novelty index value, wherein the improvement comprises determining the one or more resource recommendations directed toward developing a current personalization, associated with a user of the wireless device, based at least in part on the plurality of assigned novelty index values, wherein the determining one or more resource recommendations is based at least in part a current context-activity pair comprising the context information with respect to the wireless device and a requested activity, wherein the determining one or more resource recommendations comprises adapting the one or more resource recommendations based at least in part on the context information.

* * * * *